United States Patent
Sun

(10) Patent No.: US 9,357,858 B2
(45) Date of Patent: Jun. 7, 2016

(54) LOW VOLTAGE PLUG AND PLAY DISPLAY SYSTEM

(71) Applicant: Sungal Corporation, Westport, CT (US)

(72) Inventor: Yeyang Sun, Westport, CT (US)

(73) Assignee: Sungal Corporation, Westport, CT (US)

( * ) Notice: Subject to any disclaimer, the term of this patent is extended or adjusted under 35 U.S.C. 154(b) by 429 days.

(21) Appl. No.: 13/959,149

(22) Filed: Aug. 5, 2013

(65) Prior Publication Data

US 2014/0043797 A1 Feb. 13, 2014

Related U.S. Application Data

(60) Provisional application No. 61/680,987, filed on Aug. 8, 2012.

(51) Int. Cl.

| | |
|---|---|
| *A47B 23/06* | (2006.01) |
| *A47B 97/00* | (2006.01) |
| *F21V 33/00* | (2006.01) |
| *A47F 5/00* | (2006.01) |
| *B23P 19/00* | (2006.01) |
| *A47F 3/00* | (2006.01) |
| *A47F 5/10* | (2006.01) |

(52) U.S. Cl.
CPC ............... *A47F 5/0018* (2013.01); *A47F 3/001* (2013.01); *A47F 5/103* (2013.01); *B23P 19/00* (2013.01); *F21V 33/0012* (2013.01); *Y10T 29/49826* (2015.01)

(58) Field of Classification Search
CPC ....... A47F 5/0018; A47F 5/103; A47F 3/001; F21V 33/0012; F21V 33/002
See application file for complete search history.

(56) References Cited

U.S. PATENT DOCUMENTS

| | | | | | |
|---|---|---|---|---|---|
| 3,209,709 | A | * | 10/1965 | Shoffner | ................ A47F 5/103 108/108 |
| 4,489,995 | A | * | 12/1984 | Barr | ...................... A47F 3/0447 312/116 |
| 6,209,831 | B1 | * | 4/2001 | Kiplinger | .............. A47F 5/0869 211/59.1 |
| 2008/0121146 | A1 | * | 5/2008 | Burns | ..................... A47F 5/101 108/23 |
| 2013/0242561 | A1 | * | 9/2013 | Kramer | ................ H01R 25/142 362/253 |
| 2013/0299439 | A1 | * | 11/2013 | Sid | ........................ A47F 5/0018 211/134 |

* cited by examiner

*Primary Examiner* — Peggy Neils
*Assistant Examiner* — Alexander Garlen
(74) *Attorney, Agent, or Firm* — Ohlandt, Greeley, Ruggiero & Perle, L.L.P.

(57) ABSTRACT

Disclosed are display systems comprised of at least one wall panel and at least one shelf comprising a light fixture, the wall panel having two rows of parallel slots, one set of parallel slots (either on the wall panel or uprights adjacent to the wall panel), providing cooperative access by support brackets disposed on the shelf for supporting the shelf, the support brackets not carrying any of the electrical circuitry for the light fixture, one other set of parallel slots providing cooperative access for electrical contact elements disposed on the shelf to an electric source element disposed on the wall panel and providing electricity to the light fixture. Also disclosed are wall panels, shelves and lighting devices that may be used, alone or in combination, for new installations or in retrofitting existing display systems.

19 Claims, 26 Drawing Sheets

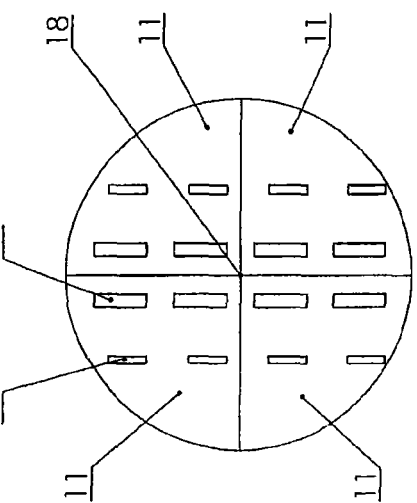
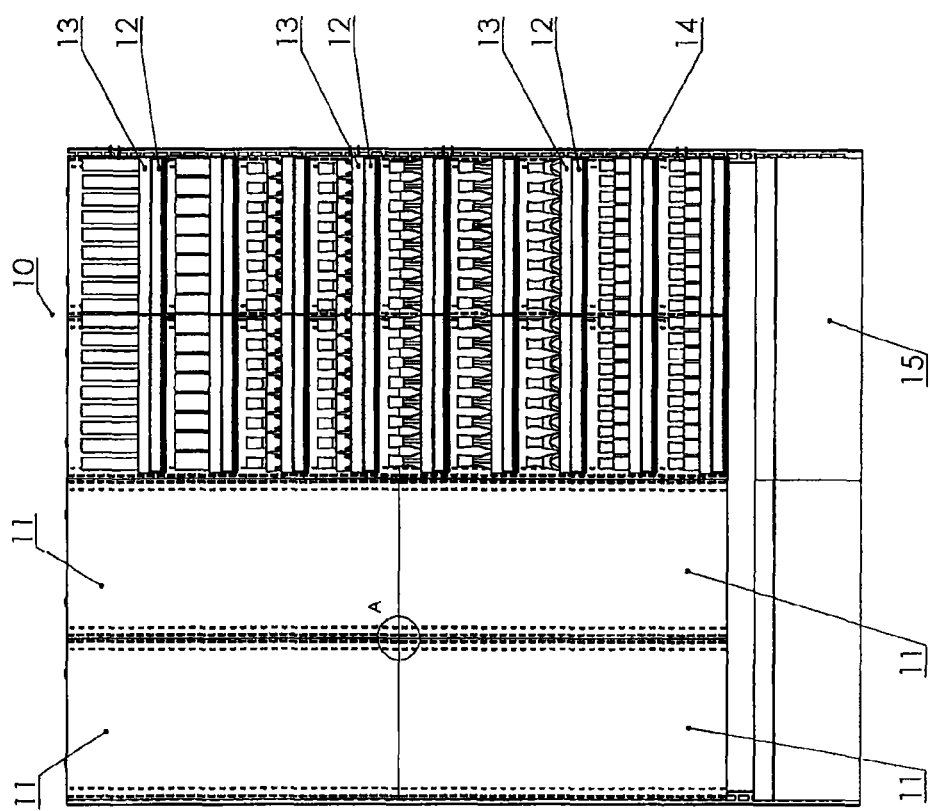

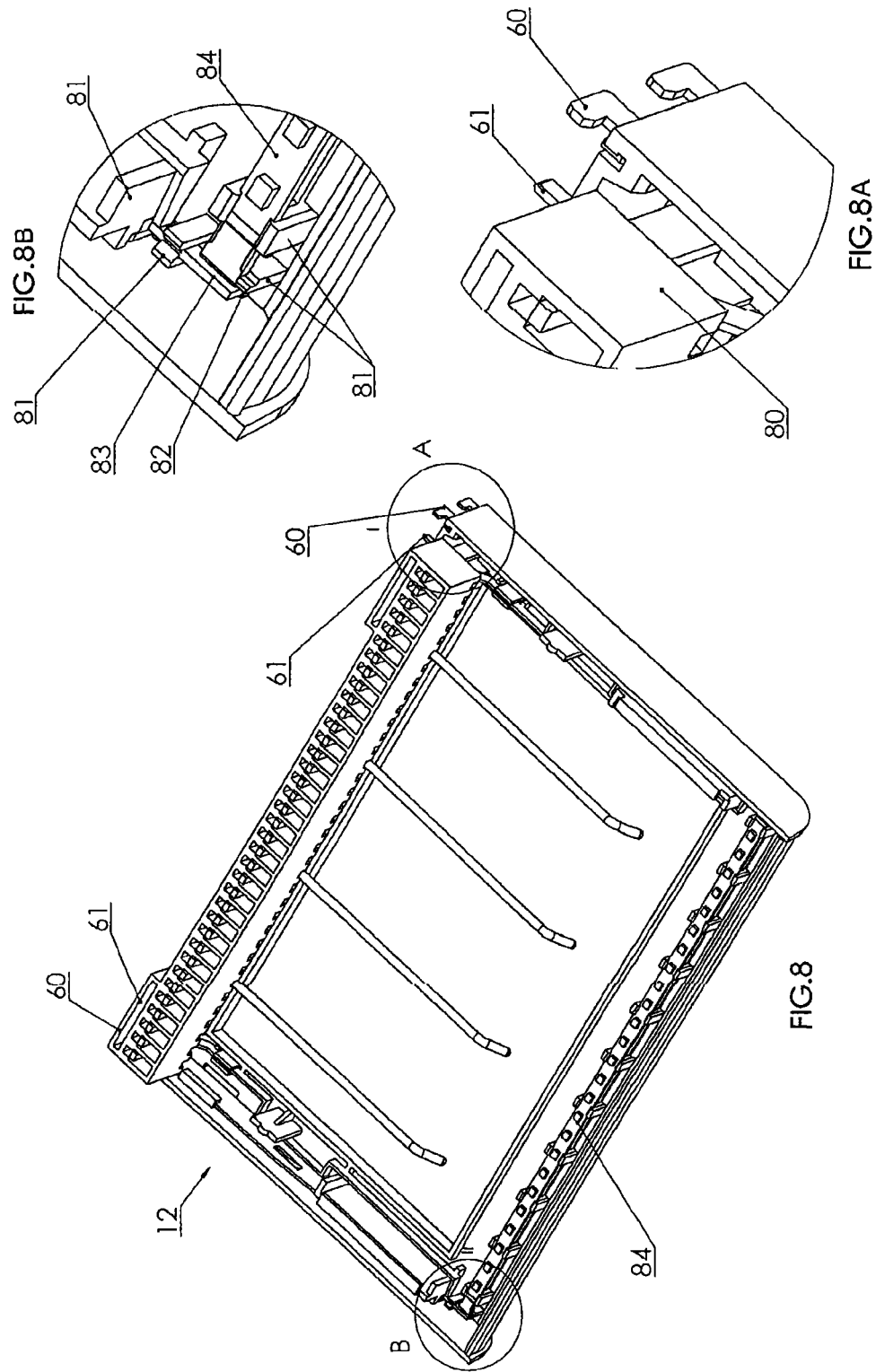

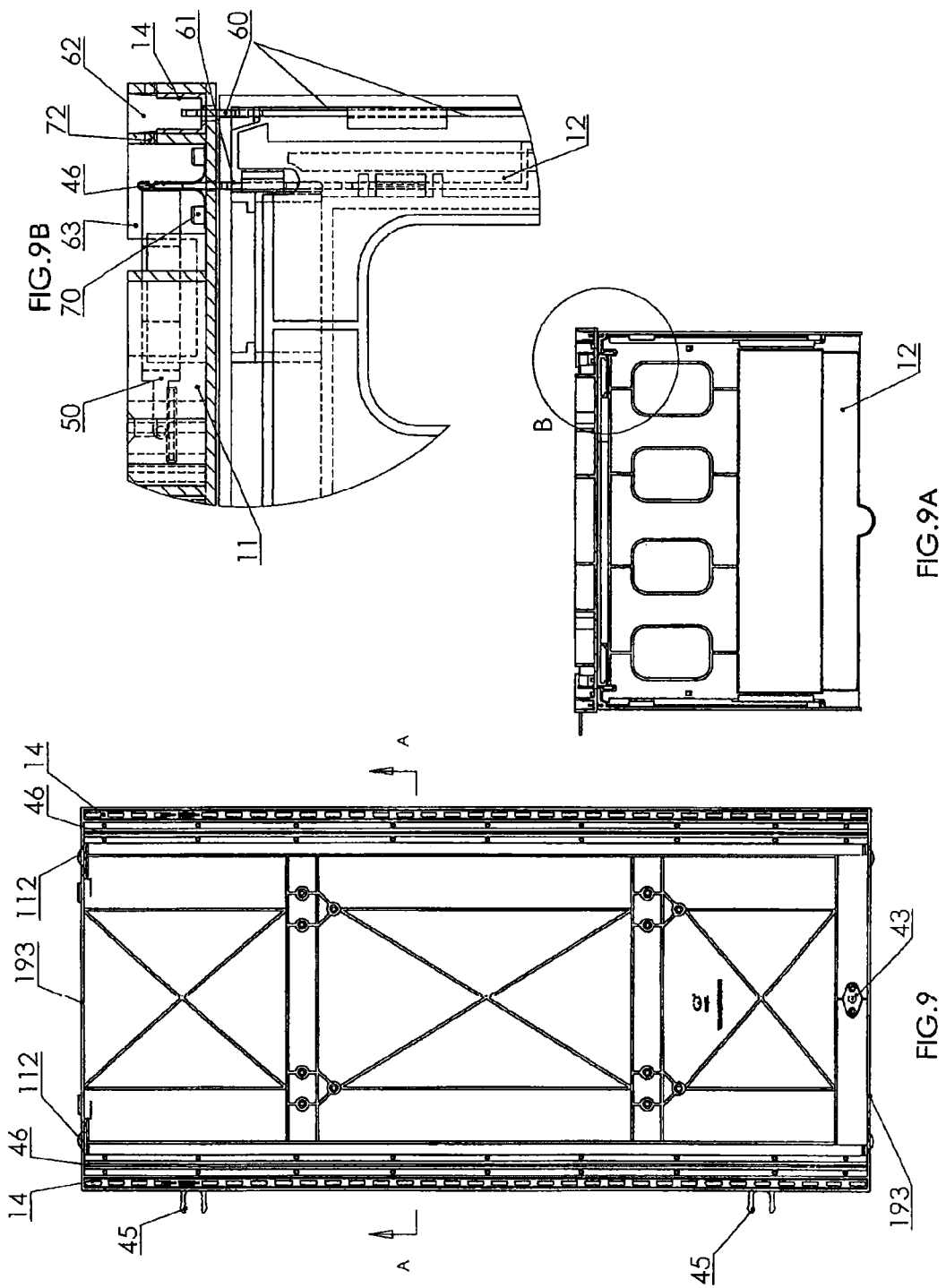

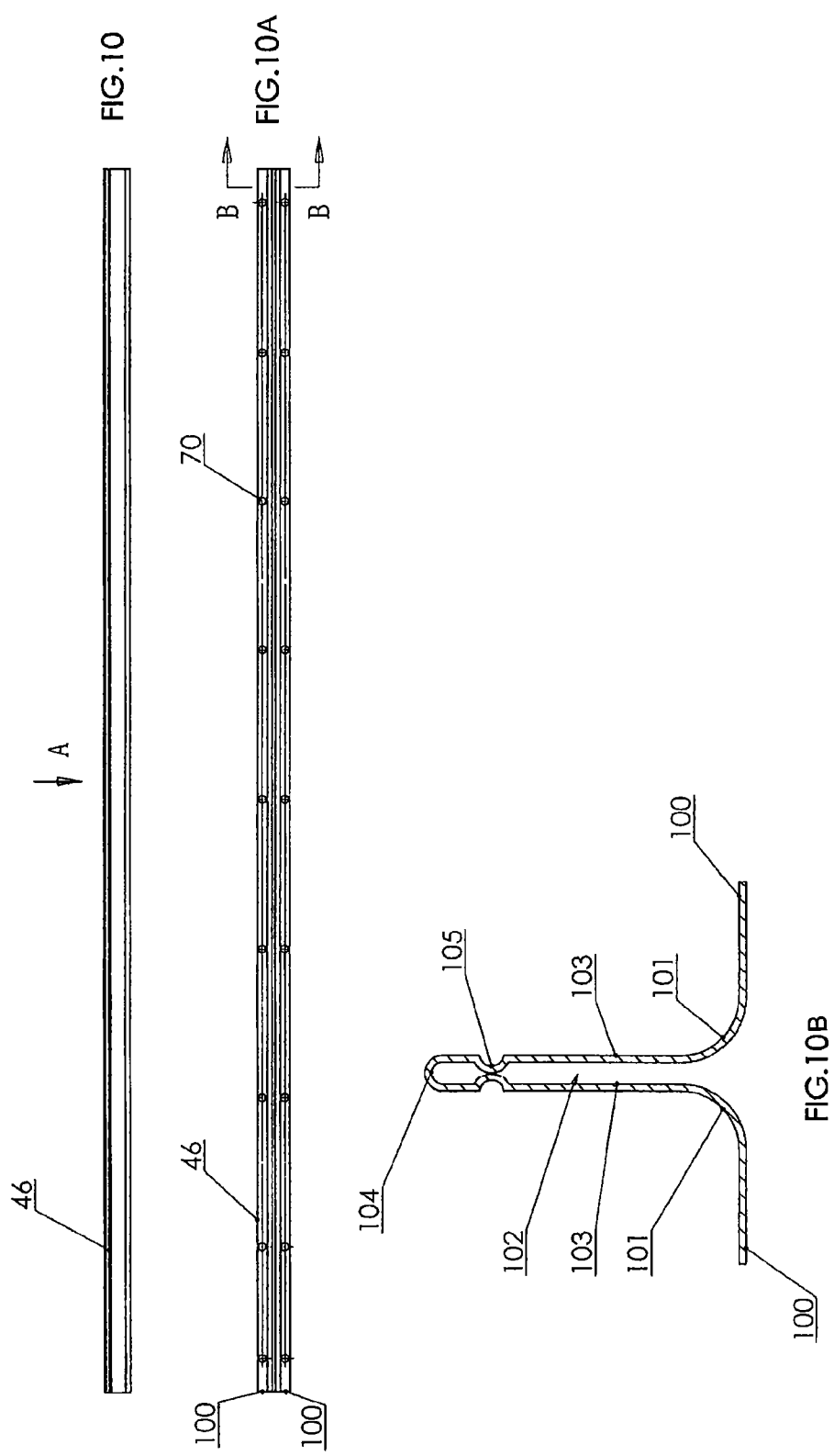

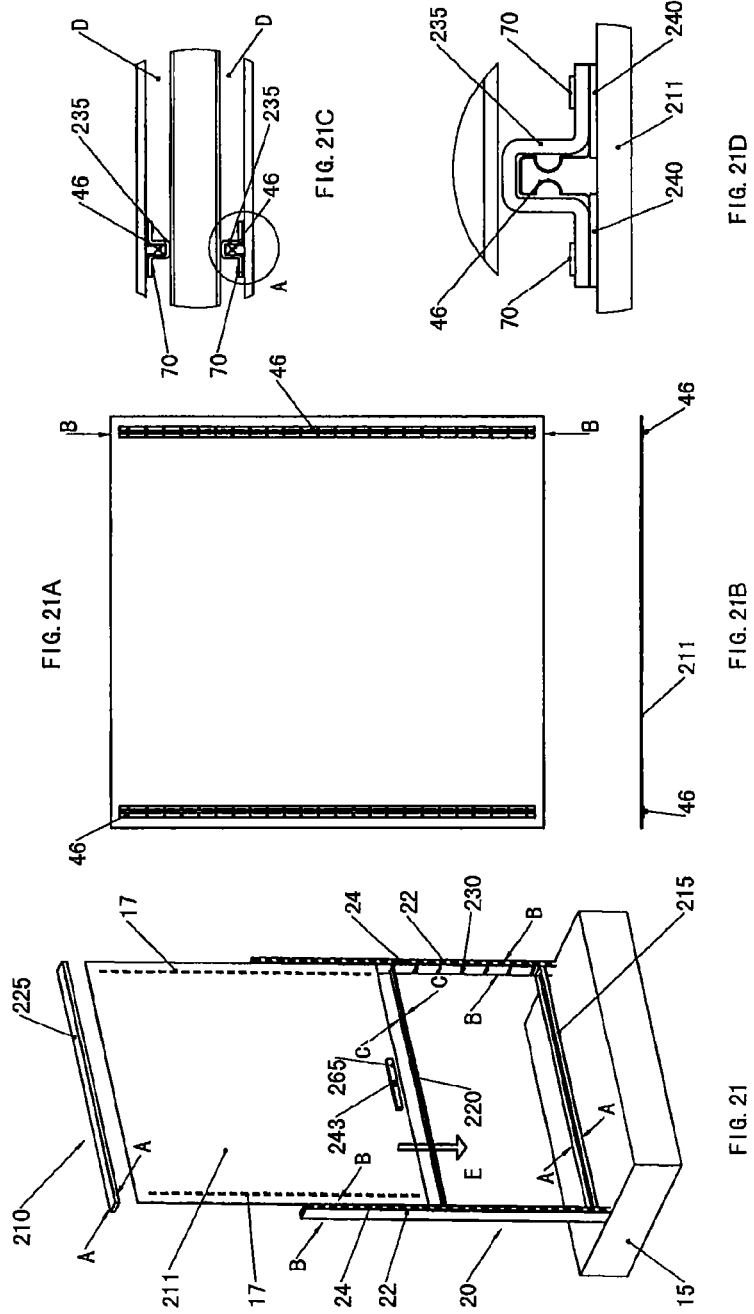

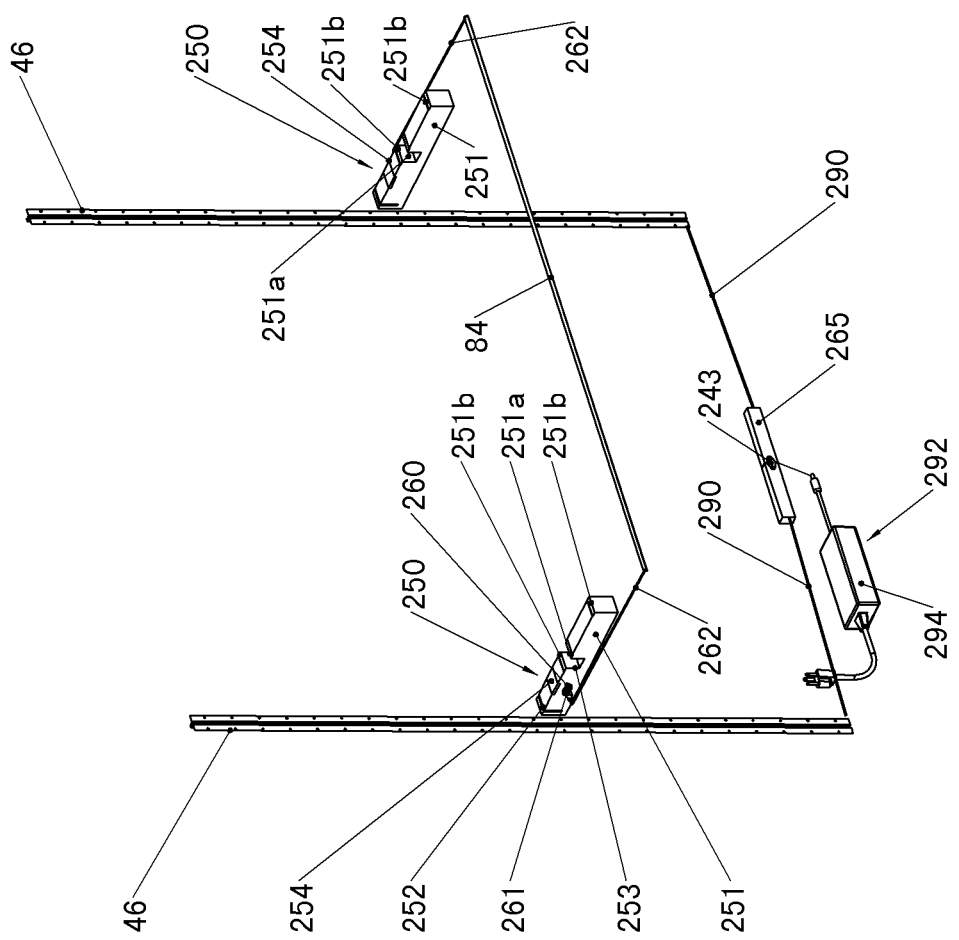

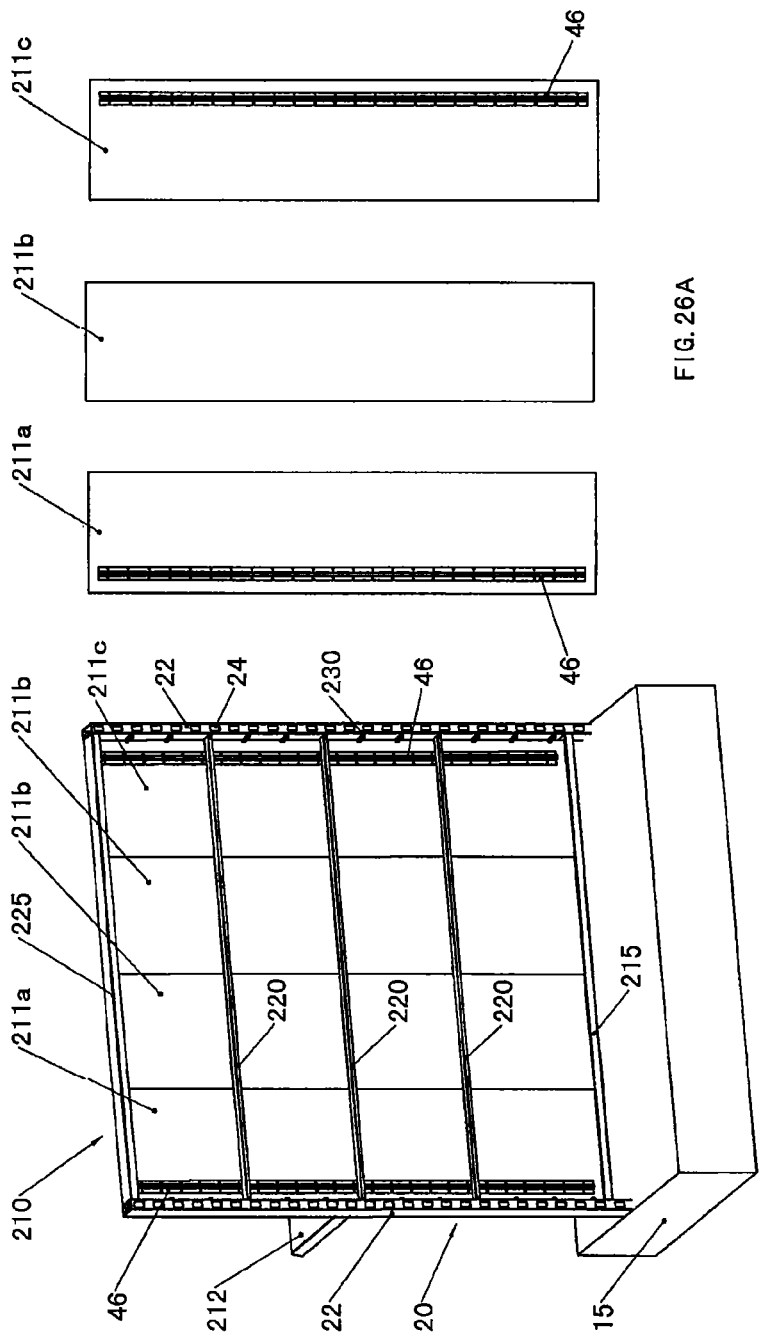

LOW VOLTAGE PLUG AND PLAY DISPLAY SYSTEM

CROSS-REFERENCED APPLICATION

This application claims priority to U.S. Provisional Application Ser. No. 61/680,987, filed on Aug. 8, 2012, that is incorporated herein in its entirety by reference thereto.

BACKGROUND

1. Field of the Disclosure

The present disclosure relates generally to a display system having a lighting mechanism for illuminating an item below that is on display. The display system includes at least a removable shelf and wall panel and may include other structures for display purposes. More particularly, the present disclosure relates to an illuminated display system. Preferably, the display system utilizes light emitting diode (LED) lighting as part of the display system.

2. Description of Related Art

A typical method of lighting shelves includes lighting connected to the shelves. These shelving and lighting structures generally enclose internal wiring and lighting that may be used to illuminate items on the shelves. This lighting method, however, generally prohibits the flexibility associated with modular shelving. More particularly, this shelf structure generally will not allow for disconnecting a shelf from a first location on a support structure and connecting the shelf at a second different location on the support structure. In addition, the above shelving systems are based on relatively high voltage AC power sources that introduce excess wiring, resulting in somewhat complex wiring on the shelves themselves and/or the use of "step-down" transformers or ballasts to cut down the voltage between the electric source and the lights. In addition, the electrical connections of the prior art shelving systems are not completely insulated from the shelving components themselves, and offer opportunities for electrical shock to shoppers and employees placing inventory on the shelves and/or moving the shelves from one location to another. In the shelving systems above-described, the standards into which the shelves hook for support also provide the electric current for powering lights associated with the shelves; thus, the standards must be made of metal for the purpose of conducting the electricity and completing the electric circuit.

Accordingly, there is a need for a modular display system that provides completely insulated electrical circuitry from the power source to the lighting fixtures and back. Also there is a need for a display system wherein low voltage DC current is supplied to the display system and that does not require the use of step-down transformers or ballasts at the light fixtures themselves.

SUMMARY

In accordance with the present disclosure, there is provided a display system comprising: at least one wall panel comprising at least a first pair of oppositely disposed support slots arranged vertically along the length of said panel and at lease a second pair of oppositely disposed slots disposed inside of said first pair of said slots; and at least one removable product display shelf having a lighting device, a top side and a bottom side, a pair of non-conductive support brackets and a pair of electrical contact elements, wherein said lighting device, said brackets and said contact elements are disposed about said bottom side of said shelf; wherein said pair of said support brackets are disposed about said shelf so as to align with and secure to said first pair of support slots, said first pair of support slots not providing access to any electrical source; and wherein said electrical contact elements are disposed about said shelf so as to align with and electrically connect through said second pair of slots to contact an electric source, thereby providing an energy source to power said lighting device.

Thus, in accordance with the present disclosure, standards that provide cooperative access for the support brackets do not need to be made of any metal component (although they may be so made). Rather, the standards that provide cooperative access for support brackets may be made completely of plastic. All that is required of the standards is that they be of sufficient strength to support the load presented by the shelves, both vertically and laterally.

Also in accordance with the present disclosure, all of the electricity-bearing elements of the wall panel and shelf are insulated from contact with other components of the display system. The electricity-bearing elements are only in contact with each other, or are otherwise set in or held by plastic elements. Moreover, the electric source is low voltage (12-24 V) DC current, so that even if any stray voltage were to escape to other elements of the display system, the risk of shock or fire hazard is extremely low.

Further in accordance with the present disclosure, as stated above, the shelf comprises electrical contact elements separate from the support brackets. The electric contact elements transfer electricity through a single electric conduit from a first set of parallel slots to an LED strip, then through the LED strip and back to a second set of parallel slots for accepting return of the DC current, thereby completing the electric circuit. Thus, the shelf has matching electric contact elements disposed on opposite sides of the shelf, each electric contact element contacting a separate electric source element disposed on the wall panel. In this manner, the electric current is capable of proceeding in either direction along the electric contact elements of the shelf.

Still further in accordance with the present disclosure, the wall panel comprises two separate channel elements on the back side thereof. In one of the two separate channels is disposed a standard for accepting support brackets disposed on a shelf. In a separate channel is disposed an electric source element for accepting electrical contact elements disposed on the shelf. The two channels are disposed on the back side of wall panel such that there is a non-conductive barrier between the two. The non-conductive barrier is preferably a plastic wall running the length between the two channels. The electric source element is preferably of a channel design such that the entire length of the electric source element provides access for the electric contact elements disposed on the shelf and, preferably, the channel of the electric source element is provided with a design and material, such as spring-clip design of a ductile material that provides for tight fit for the electrical contact elements disposed on the shelf. Also preferably, the electric source element is attached to the wall panel through the use of non-conductive attachment elements such as plastic screws.

Also in accordance with another embodiment of the present disclosure, the first pair of oppositely disposed support slots arranged vertically along the length of the wall panel can be replaced by gondola slots that are generally arranged vertically along the length of the uprights of the gondola. Electrically conductive channels, as will become apparent to those skilled in the art based on the disclosure that follows, are placed behind the wall panel. The wall panel comprised of the aforementioned conductive slots and associated electrically conductive channels can be a single wall panel or can be assembled by several "unit" panels. The wall panel, whether a single wall panel or comprised of a plurality of "unit" wall panels can be inserted between the generally nominally configured opposing uprights of the gondola, as such gondolas are known to those of skill in the art. In this optional configuration, the wall panel(s) can replace some or all of the "pegboard" that is generally disposed between the uprights of a gondola, as is known to those of skill in the art.

Also in accordance with one embodiment of the present disclosure, the path of the electric conduit disposed in the shelf is guided by and around clamp elements that are also made of plastic so as to further insulate the electricity-bearing elements from other elements of the display system. Furthermore, the clamp elements fasten the path of electric conduit disposed in the shelf to secure it in close contact to both a copper clip-belt and snap-in pole as will be explained in more detail in the disclosure that follows.

Still further in accordance with the present disclosure there is provided a display system comprising a base, at least two substantially parallel uprights disposed substantially vertically on said base, said uprights each having at least one row of slots disposed therein arranged vertically along a length of said uprights, at least one wall panel disposed between said uprights, said at least one wall panel having at least one row of slots disposed therein arranged vertically along a length of the wall panel; and at least one shelf comprising a lighting device, wherein the at least one row of slots disposed on said uprights provide cooperative access by support brackets disposed on the shelf for supporting the shelf, which support brackets do not carry any of the electrical circuitry for the lighting device, wherein the at least one row of slots disposed on the wall panel provide cooperative access for electrical contact elements disposed on the shelf to an electric source element that provides electricity to the lighting device, wherein the electrical contact elements disposed on the shelf do not make contact with the support brackets disposed on the shelf; and wherein the electric source element is disposed on the wall panel on the opposite side of the wall panel from the shelf.

In yet a further embodiment of the present disclosure, there is provided a shelf and lighting device combination comprising a shelf having at least a pair of support brackets, a top side and an underside, the at least pair of support brackets disposed about said shelf so as to align with and engage support slots such that said shelf is provided with support for accepting a load placed on the top side of said shelf, which support brackets do not carry any electrical circuitry for the lighting device and a lighting device disposed on the underside of said shelf, the lighting device having at least a pair of electrical contact elements, a light fixture, and conductive elements connecting the light fixture to the electrical contact elements, the at least pair of electrical contact elements disposed about said shelf so as to align with and engage an electric source that provides electricity to the lighting device, wherein the electrical contact elements do not make contact with the support brackets.

The present disclosure additionally provides for lighting device adapted to be disposed on the underside of a shelf, the lighting device having at least a pair of electrical contact elements, a light fixture, and conductive elements connecting the light fixture to the electrical contact elements, the at least pair of electrical contact elements adapted to align with and engage an electric source that provides electricity to the lighting device, wherein the electrical contact elements, light fixture and conductive elements connecting the electrical contact elements to the light fixture are insulated such that electricity provided by the electric source is not conducted to the shelf.

Additionally in accordance with the present disclosure, there is provided a method of retrofitting an existing display system having a base and at least two substantially parallel uprights disposed substantially vertically on said base, the uprights each having at least one row of slots disposed therein arranged vertically along a length of said uprights, the method comprising disposing at least one wall panel between said uprights, said at least one wall panel having at least one row of slots disposed therein arranged vertically along a length of the wall panel, and disposing on said wall panel at least one shelf comprising a lighting device, wherein the at least one row of slots disposed on said uprights provide cooperative access by support brackets disposed on the shelf for supporting the shelf, which support brackets do not carry any of the electrical circuitry for the lighting device, wherein the at least one row of slots disposed on the wall panel provide cooperative access for electrical contact elements disposed on the shelf to an electric source element that provides electricity to the lighting device, wherein the electrical contact elements disposed on the shelf do not make contact with the support brackets disposed on the shelf; and wherein the electric source element is disposed on the wall panel on the opposite side of the wall panel from the shelf.

Also, there is disclosed in accordance with the present disclosure a method of retrofitting an existing display system having a base, at least two substantially parallel uprights disposed substantially vertically on said base, the uprights each having at least one row of slots disposed therein arranged vertically along a length of said uprights, a wall panel having an electric source, and at least one shelf, the method comprising disposing on said shelf a lighting device having at least a pair of electrical contact elements, a light fixture, and conductive elements connecting the light fixture to the electrical contact elements, the at least pair of electrical contact elements adapted to align with and engage said electric source for providing electricity to the lighting device, wherein the electrical contact elements, light fixture and conductive elements connecting the electrical contact elements to the light fixture are insulated such that electricity provided by the electric source is not conducted to the shelf.

These and other aspects of the present disclosure will become known to those of skill in the art from the detailed description that follows.

BRIEF DESCRIPTION OF THE DRAWINGS

FIG. 1 is a front view of a display assembly of the present disclosure; and FIG. 1A is an enlarged view of the junction of four individual wall panels such as at "A" in FIG. 1.

FIG. 8 is a bottom perspective view of a carry tray of the present disclosure; FIG. 8A is an enlarged view of the section shown at "A" in FIG. 8; and FIG. 8B is an enlarged view of the section shown at "B" in FIG. 8;

FIG. 9 is a rear view of a wall panel having a shelf attached thereto (not shown) on the front side of the wall panel, at line "A"-"A", of the present disclosure; FIG. 9A is cross-sectional view of the underside of the wall panel and shelf through line "A"-"A" showing the shelf and wall panel connection; and FIG. 9B is an enlarged view of the detail shown at "B" in FIG. 9B;

FIG. 10 is a side view of a copper clip-belt of the present disclosure; FIG. 10A is a front view of a copper clip-belt of the present disclosure; and FIG. 10B is a cross-sectional view of a copper clip-belt of the present disclosure at "B"-"B" in FIG. 10A;

FIG. 11 B is a side view through line "B"-"B" of a copper strip of the present disclosure.

FIG. 14A is an enlarged view of a section of part of the electrical connections of the carry tray, as shown at "A"

FIG. 19A is an enlarged view of a section of the bottom of the wall panel, as shown at "A", of the present disclosure; and FIG. 19B is an enlarged view of a section of the vertical connection between two wall panels, as shown at "B", of the present disclosure;

FIG. 21 is a perspective view of a partially disassembled display assembly of FIG. 20; FIG. 21A is a rear view of the wall panel shown in FIG. 21; FIG. 21B is a top view of the wall panel of FIG. 21A through line "B"-"B"; FIG. 21 C is a close-up top view of a double-faced structure comprising two wall panels of FIG. 21A; and FIG. 21D is an enlarged view of the detail shown at "A" in FIG. 21C;

FIG. 25 is a skeletal schematic of the electric circuitry of the power supply for the display assembly shown in FIG. 20; and FIG. 26 is a perspective rear view of a multi-panel display system of the present disclosure having a series of four (4) wall panels that replace the pegboard in a gondola; FIG. 26A shows the left unit panel, one (1) center unit panel and the right unit panel of the multi-panel display shown in FIG. 26.

DETAILED DESCRIPTION OF THE DISCLOSURE

Figure 2:
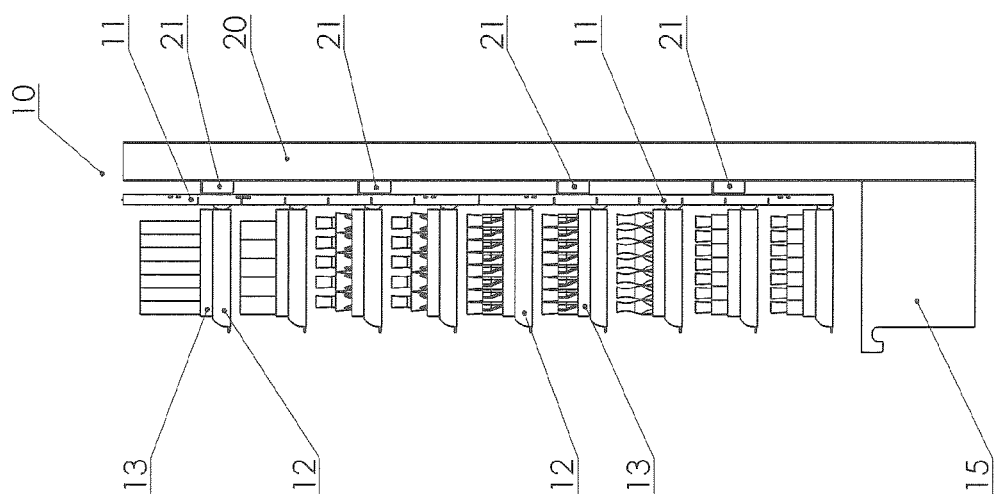
FIG. 2 is a side view of the display assembly of FIG. 1 of the present disclosure.

The present disclosure will now be described in more detail with reference to the specific embodiments shown in the Figures. In the description of the specific embodiments in the Figures that follows, like elements will be denoted by like reference numbers.

FIG. 1 shows a wall display unit 10 having connected wall panels 11. Hanging on wall panels 11 of wall display unit 10 are various carry trays 12 having insert trays 13 therein, that will be described in more detail in conjunction with other Figures. Wall panels 11 of wall display unit 10 are connected to standards 14 disposed behind standard slots 16 (see, FIG. 1a). Deck 15 is part of gondola 20, shown in FIG. 2. FIG. 1A shows, in enlarged view, section "A" of FIG. 1. In FIG. 1A four wall panels 11 are joined at junction 18 as will be more fully described hereinafter. As is shown in FIG. 1A, each wall panel has rows of generally parallel disposed slots, standard slots 16 and connector tab slots 17. Standard slots 16 are for accepting bracket supports (shown, for example, in FIG. 8A) disposed on carry trays 12. Connector tab slots 17 are for accepting electric connector tabs (shown, for example, in FIG. 8A) also disposed on carry trays 12. Wall panels 11 can be of any desired size, but preferably are 12" wide and 25" high, or 12" wide and 6" high. With these dimensions, a complete wall display unit 10 may be constructed having widths of 12", 24", 36", 48", etc. (i. e., any width as a multiple of 12") and heights of 25", 50", 56", 62", 68", etc. (any height that can be calculated as a sum of 6" and 12"). As mentioned above, standards 14 for use in the present disclosure may be metal or metal insert with plastic sleeve, or entirely of plastic, so long as standards 14 are of sufficient strength to support the load presented by carry trays 12 and merchandise on carry trays 12, both vertically and laterally.

FIG. 2 shows wall display unit 10 in side view. Wall panels 11, carry trays 12, insert trays 13 and deck 15 are as described in relation to FIG. 1. Also shown in FIG. 2 is gondola 20 and brackets 21. Deck 15 and gondola 20 provide support for wall display unit 10 and wall panels 11. Brackets 21 are part of the hook bar (element 41 in FIG. 4), and are connected to gondola 20 through interconnecting fit with gondola slots 24 that are also on gondola 20, best seen in FIG. 3. Gondola 20 is generally comprised of deck 15, two uprights 22 and pegboard 23 that are disposed so as to accept, in the embodiment shown in FIG. 1, four interconnected wall panels 11. Gondola 20 can be of any standard dimensions, such as a height of 54", 60", 66", 72" or 78" and a width of 36" or 48".

Figure 3:
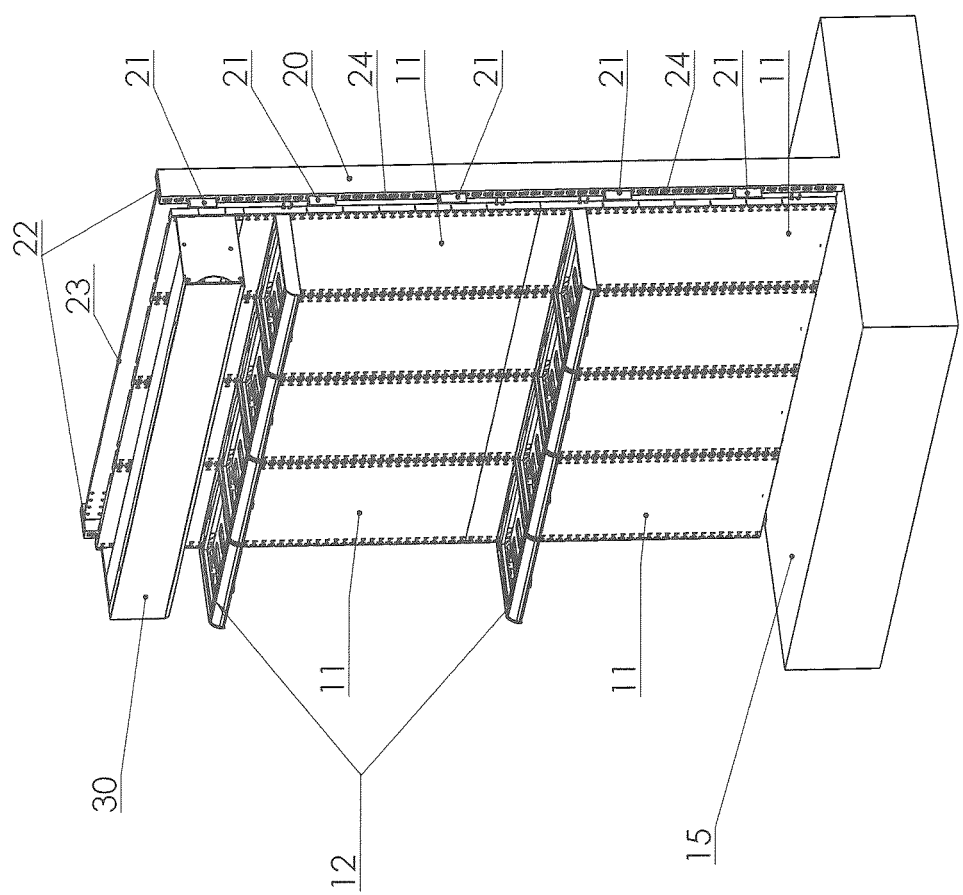
FIG. 3 is a partially dissembled front perspective view of the display assembly of FIG. 1 of the present disclosure, with light header.

FIG. 3 shows, in perspective view, assembled wall display unit 10 and again shows wall panel 11, carry trays 12 (without insert trays 13), deck 15, gondola 20, brackets 21, gondola slots 24, pegboard 23 and uprights 22. Also shown in FIG. 3 is LED light header 30.

Figure 4:
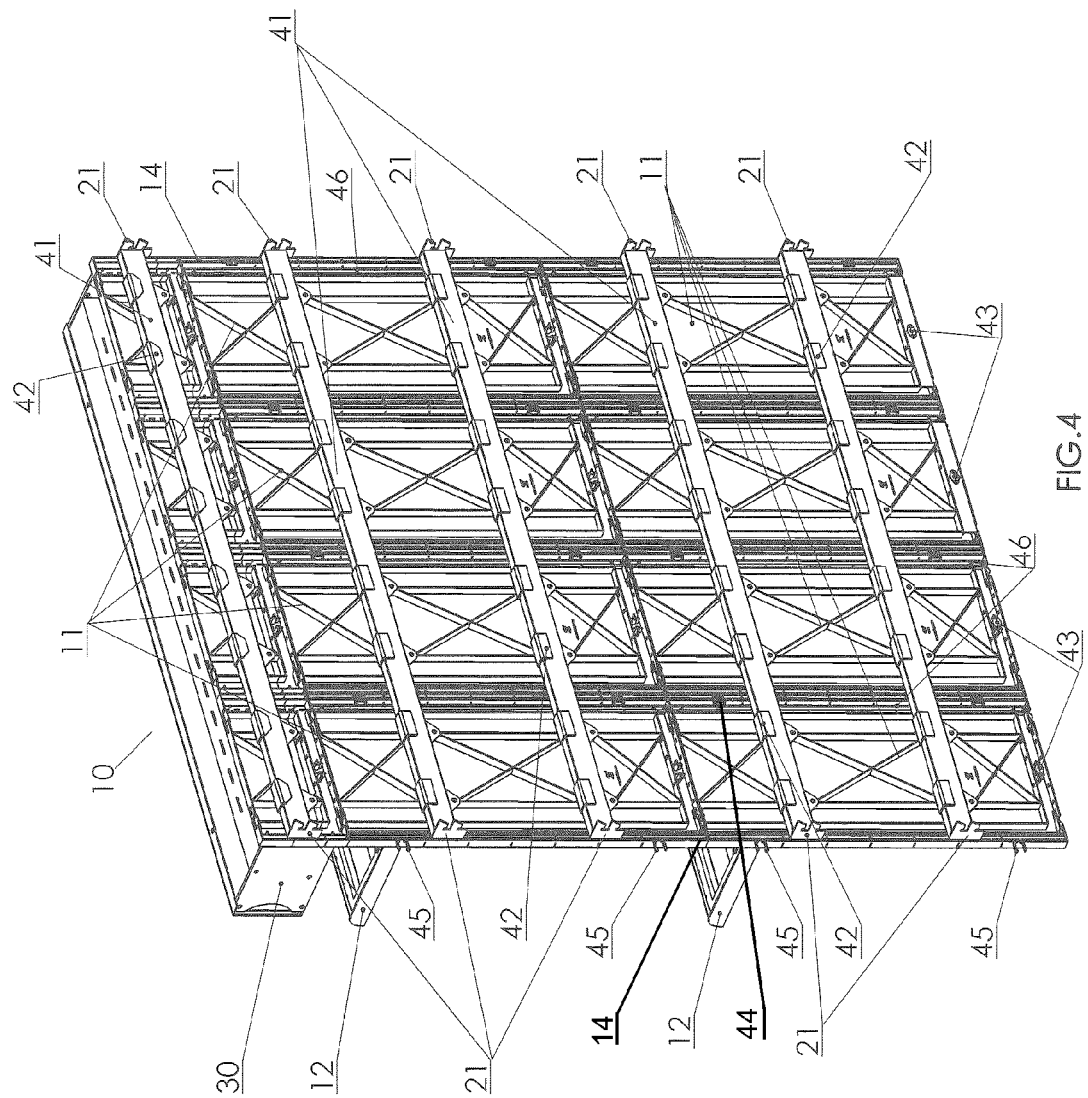
FIG. 4 is a rear perspective view of the display assembly of FIG. 1 of the present disclosure, with light header.

FIG. 4 shows a perspective rear view of wall display assembly 10. FIG. 4 shows eight interconnected wall panels 11, carry trays 12, standards 14, brackets 21 and LED light header 30. Brackets 21 are disposed at ends of hook bars 41. Brackets 21 are designed so as to cooperatively engage gondola slots 24 (see, FIG. 3) of gondola 20. Hooks 42 are attached to a rear side of wall panel 11 by any acceptable fastener such as screws, pop rivets or similar types of fasteners. Also shown in FIG. 4 are sockets 43, locking slots 44 (as shown in more detail in FIGS. 6 and 19B), locking clips 45 and copper clip-belts 46 (shown in more detail in FIGS. 9, 9B, 10A, 10B and 19B). Hook bars 41, hooks 42, sockets 43, locking slots 44, locking clips 45 and copper clip-belts 46 will be more fully described in conjunction with the other Figures mentioned.

Figure 5A:
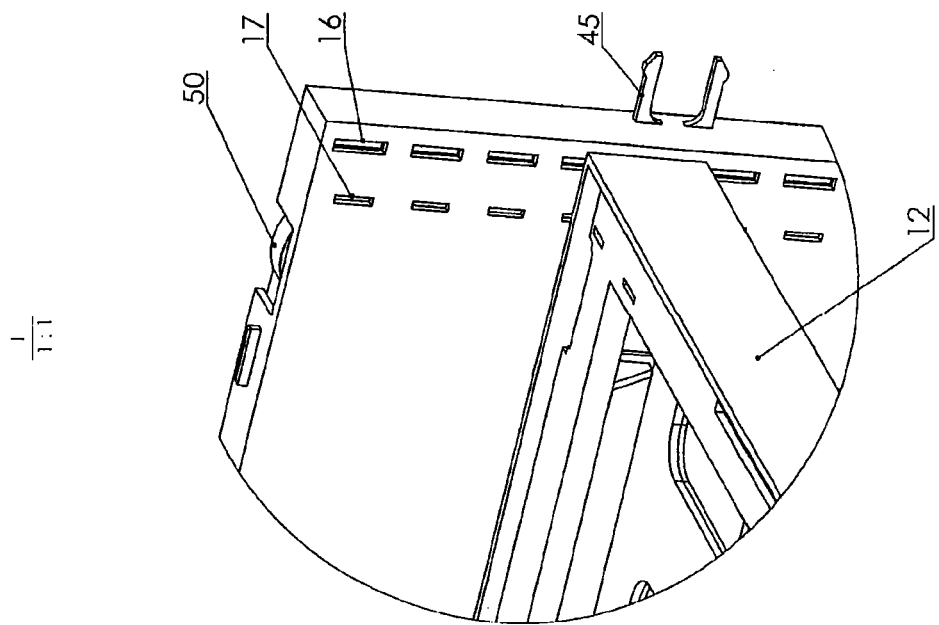
FIG. 5A is an enlarged detail view of the area of connection between the carry tray and wall panel shown at "A" in FIG. 5.
Figure 5:
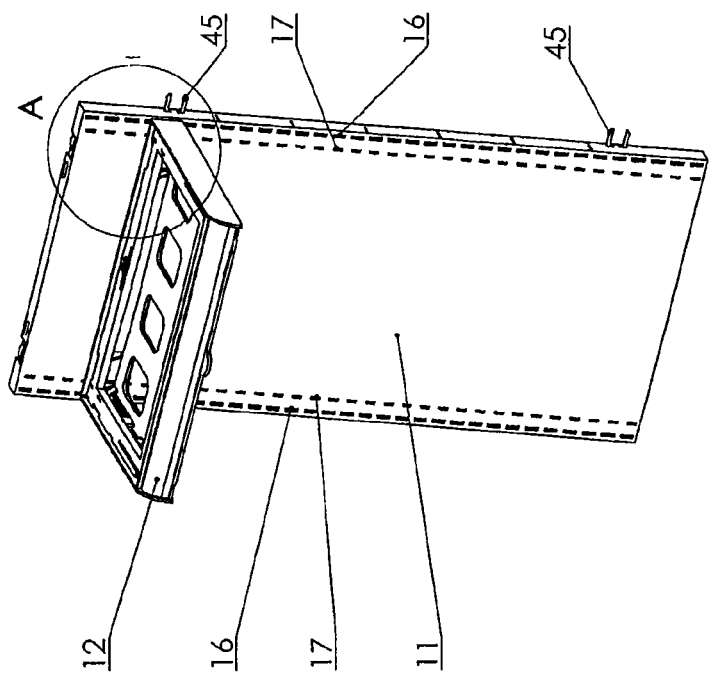
FIG. 5 is a front perspective view of a wall panel of the display assembly of the present disclosure with a carry tray in place.

FIG. 5 shows a front perspective view of a single wall panel 11 with carry try 12 (without inset tray 13) in place thereon. FIG. 5A shows an enlarged view of section "A" of FIG. 5. In FIG. 5A carry tray 12 is connected to wall panel 11 and is supported by inserting brackets (shown as 60 in FIGS. 6 and 8A) into standard slots 16 and, at the same time, connector tabs (shown as 61 in FIGS. 6 and 8a) is inserted into connector tab slots 17. Standard slots 16 and connector tab slots 17 are numbered (not shown in FIG. 5A5a) to ensure that carry trays 12 are placed at the correct height on wall panel 11. Also shown in FIG. 5A are locking clip 45 and copper strip 50, the structure and function of that will be described more fully in conjunction with FIG. 7 hereinafter.

Figure 6:
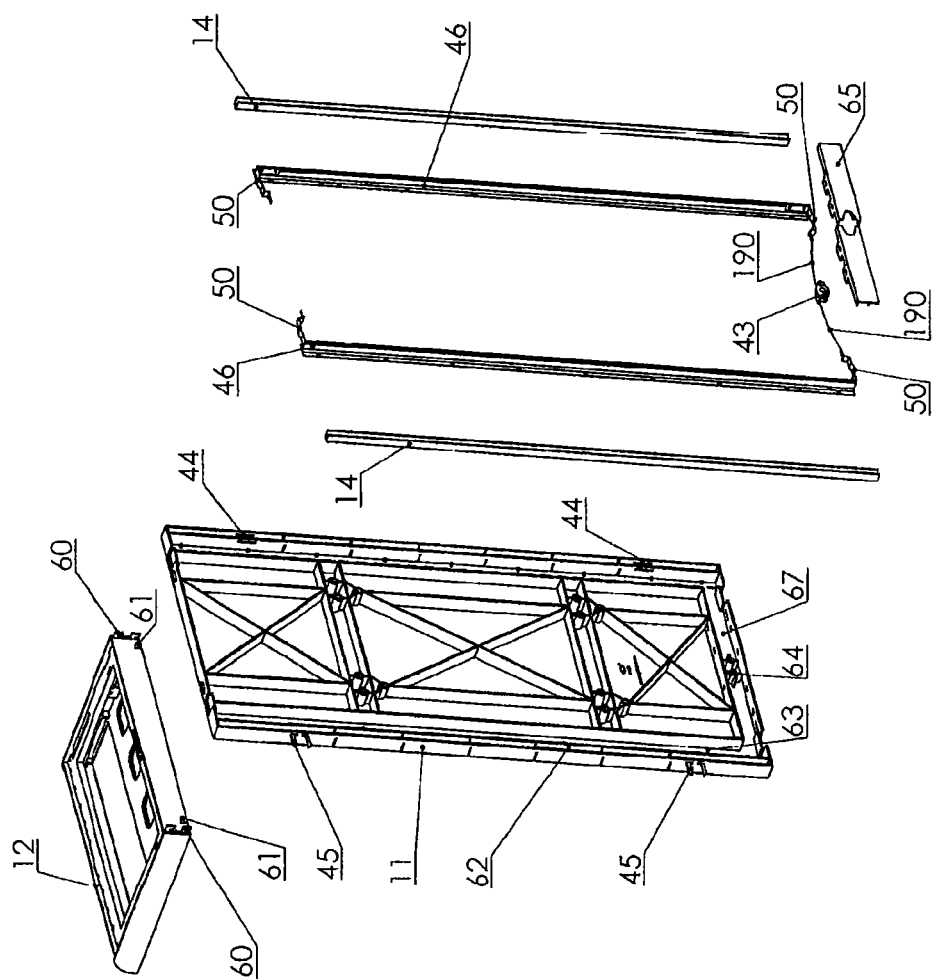
FIG. 6 is an exploded view of a circuit assembly in relation to a wall panel back and carry tray of the display assembly of the present disclosure.

FIG. 6 shows an exploded rear view of various components of assembled wall panel 11. As part of carry tray 12, there are brackets 60 and connector tabs 61 that, as explained earlier, engagingly insert into standard slots 16 and connector tab slots 17, respectively. Also on rear of wall panel 11 are standard channel 62, copper clip-belt channel 63, socket recess 64 and wire channel 67 for receiving standard 14, copper clip-belt 46, socket 43 and connecting wires 190 (described in more detail with respect to FIG. 19B), respectively. Also shown in FIG. 6 are locking slots 44, locking clip 45, plastic cover 65 and copper strip 50. The assembly of wall panels 11 and the function of the elements shown in exploded view in FIG. 6 will be more fully described in the description in conjunction with FIG. 7 and other Figures that follow.

Figure 7:
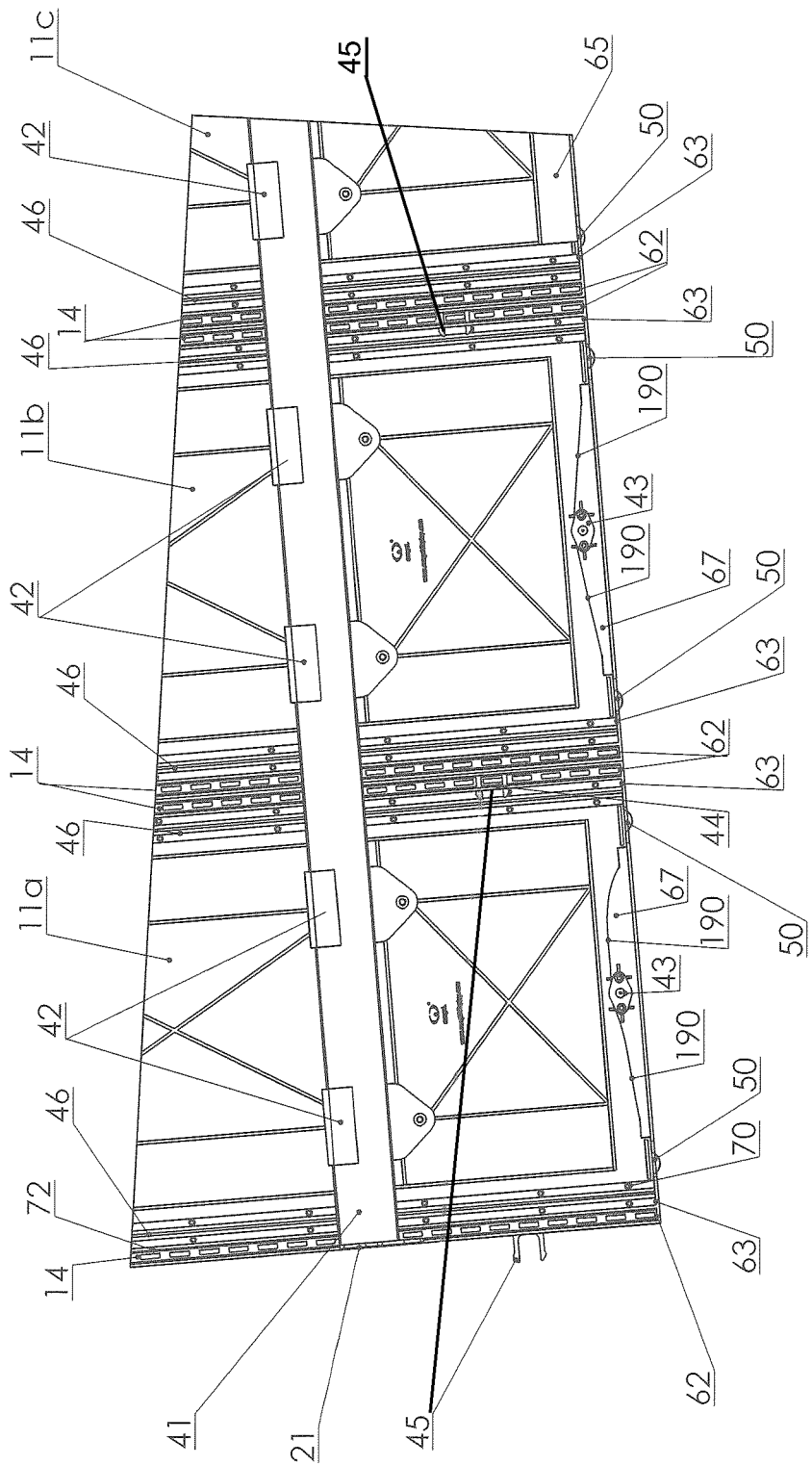
FIG. 7 is rear detail view of the juncture between adjacent wall panels, with electric circuitry connections, of a display assembly of the present disclosure.
Figure 11A:
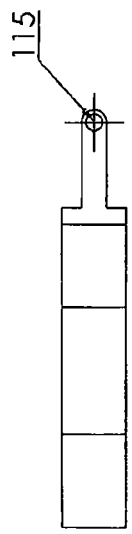
FIG. 11A is a front view through line "A"-"A" of a copper strip of the present disclosure.
Figure 11B:
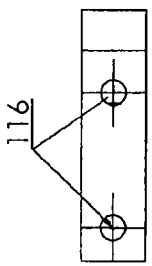
FIG. 11 is a perspective view of a copper strip of the present disclosure.
FIG. 11C is an overhead view through line "C"-"C" of a copper strip of the present disclosure.
Figure 11:
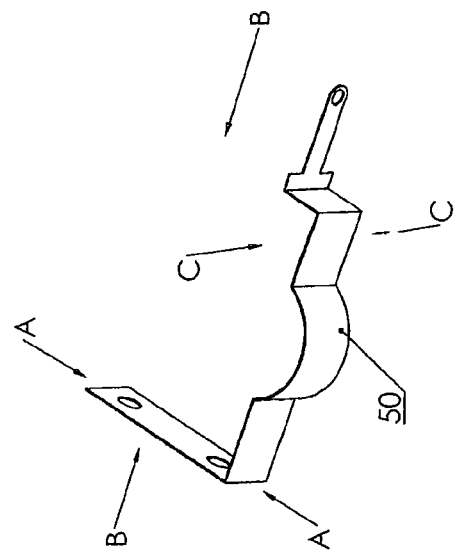

FIG. 7 shows a partial view of the lower portion of three connected wall panels 11 (11A, 11B and 11C). Also shown in FIG. 7 are standards 14, bracket 21, hooks 42, hook bar 41, locking clips 45, locking slots 44, copper clip-belts 46, plastic cover 65, copper strips 50, connecting wires 190 and wire channels 67. Wall panels 11 are assembled as follows. Standards 14 are inserted into standard channels 62 and copper strips 50 are connected to copper clip-belts 46 that are then inserted into copper clip-belt channels 63. The manner in which copper strips 50 are connected to copper clip-belts 46 will be more fully described in conjunction with FIGS. 9, 10 and 11. Standard 14 slips firmly into standard channel 62 and does not require fasteners. Copper clip-belts 46 are held in place in copper clip-belt channels 63 with plastic screws 70. Standard channels 62 have a plastic wall 72 disposed between standards 14 and copper clip-belts 46 that help to insulate current flowing through copper clip-belts 46 from other portions of wall panel 11 and, in particular, standards 14. Hooks 42 are attached to rear of wall panel 11 by, e.g., screws. Wall panel 11 is hung on hook bar 41 (which itself is hung on gondola 20 by brackets 21, as can be seen in FIGS. 2 and 3) by hooks 42 and slid laterally into the desired position. In the view shown in FIG. 7, "left" wall panel 11A, is slid first into position, then "center" wall panel 11B is slid toward "left" wall panel 11A. "Left" and "center" wall panels 11A and 11B, respectively, connect to each other by locking clips 45 that matingly engage locking slots 44. In a like manner, "right" wall panel 11C is matingly engaged to "center" wall panel 11B. Electricity is provided to copper clip-belts 46 via copper strips 50 that in turn are provided electric current from sockets 43 via connecting wires 190. Sockets 43 are provided current from plugs 191 that are connected to a power source 192 (shown in more detail in FIG. 19).

Figures 12A, 12B:
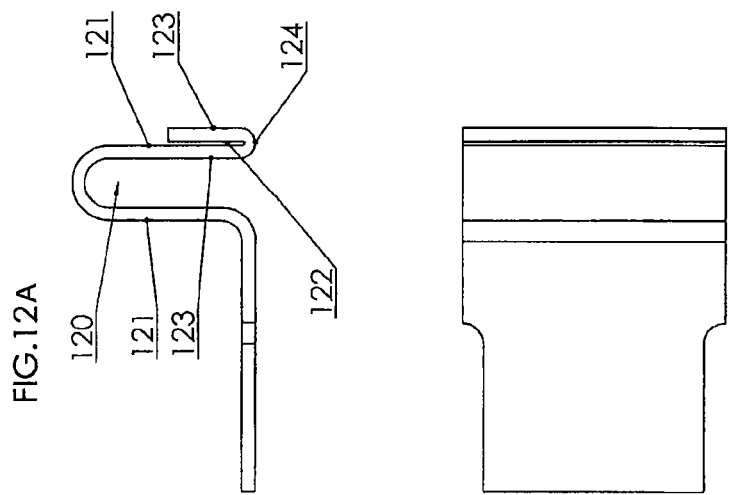
FIG. 12A is an overhead view through line "A"-"A" of a copper snap-in pole of the present disclosure.
FIG. 12B is a front view through line "B"-"B" of a copper snap-in pole of the present disclosure.
Figure 12:
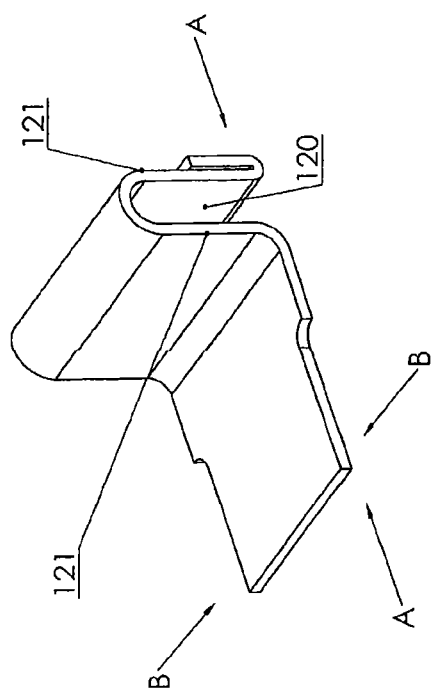
FIG. 12 is a perspective view of a copper snap-in pole, as shown in FIG. 8b, of the present disclosure.

FIG. 8 shows the underside of carry tray 12, showing how electric current is provided to LED strip 84. As described earlier, brackets 60 and connector tabs 61 engagingly insert into standard slots 16 and connector tab slots 17, respectively. Brackets 60 and connector tabs 61 are shown in enlarged view in FIG. 8A. Connector tabs 61 are connected to metal connector 80 that is connected to LED strip 84 via copper snap-in pole 82, as shown in FIG. 8, and in enlarged view in FIG. 8a. Various clamps 81 serve to tightly hold metal connector 80 from connector tab 61, copper snap-in pole 82, and connector head 83 to LED strip 84. FIG. 8B shows an enlarged view of the connection between metal connector head 83 and LED strip 84. At the end of LED strip 84 there is attached copper snap-in pole 82 that is more clearly seen in FIG. 12. FIG. 12 shows copper snap-in pole 82 in perspective view; in FIG. 12A copper snap-in pole is shown in side view along line "A"; and in FIG. 12B copper snap-in pole is shown in overhead view along line "B". Turning back to FIG. 8B, copper snap-in pole 82 engages connector head 83 via bend 120 formed between relatively parallel sides 121 of copper snap-in pole 82 and provides electric current to LED strip 84. Copper snap-in pole 82 also has reverse bend 122 formed between relatively parallel sides 123. Reverse bend 123 serves to simplify engagement of copper snap in pole 82 over connector head 83 by providing smooth rounded section that slides over connector head 83 more easily. As can be understood, and as seen in FIG. 8, there is a copper snap-in pole 82 at each end of LED strip 84 serving to complete the circuit between the two connector tabs 61 provided on each shelf.

FIG. 9 shows a view of the back side of wall panel 11 with carry tray 12 in place (not shown). FIG. 9A is a cross-sectional view of the underside of carry tray 12 in place on wall panel 11 through line "A"-"A"; and FIG. 9b is an enlarged view of section "B" of FIG. 9A. FIG. 9B9b shows the electrical connections between power source (connected to wire 192 in FIG. 19) and connector tabs 61 via copper clip-belt 46 and copper strip 50. FIG. 9B will be described in conjunction with FIGS. 10 and 11. As shown earlier in connection with FIG. 7, copper clip-belt 46 is attached to back of wall panel 11 using, e.g., plastic screws 70 and is disposed in copper clip-belt channel 63 essentially parallel to standard 14 disposed in standard channel 62. Also, as described with respect to FIG. 7, plastic wall 72 is disposed between standard 14 and copper clip-belt 46. As shown in FIG. 9b, bracket 60 passes through rear of wall panel 11 via standard slot 16 and engages standard 14 to support carry tray 12. Also as shown in FIG. 9B, connector tab 61 passes through wall panel 11 via connector tab slot 17 and engages copper clip-belt 46. Seen in FIGS. 10, 10A and 10B are side view, overhead view (along line "A") and cross-sectional view (through line "B"-"B"), respectively, of copper clip-belt 46. FIG. 9B shows copper clip-belt 46 also in cross-sectional view. Copper clip-belt 46 has two flange-like portions 100 bending at about 90° and forming opening 102 between two generally parallel sides 103 of copper clip-belt 46. The two general parallel sides 103 meet at curved end 104. Disposed near curved end 104 is crimp 105 the purpose of which will be explained in conjunction with copper strip 50. Opening 102 is provided along entire length of copper clip-belt 46 to ensure that connector tabs 61 will access opening 102 through connector tab slots 17. In this manner, copper clip-belt 46 can hold connector tabs 61 more firmly to secure contact between connector tabs 61 and copper clip-belt 46.

Figure 11C:
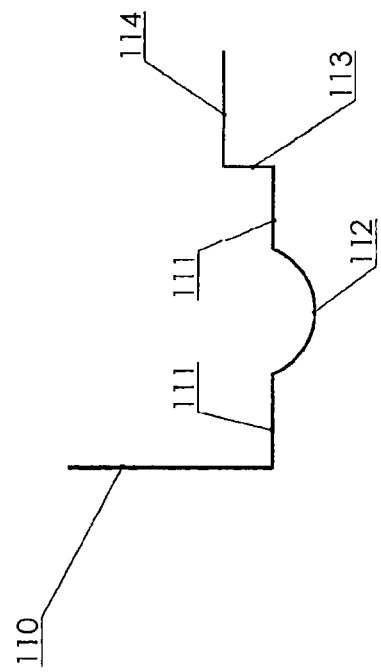
Figure 19:
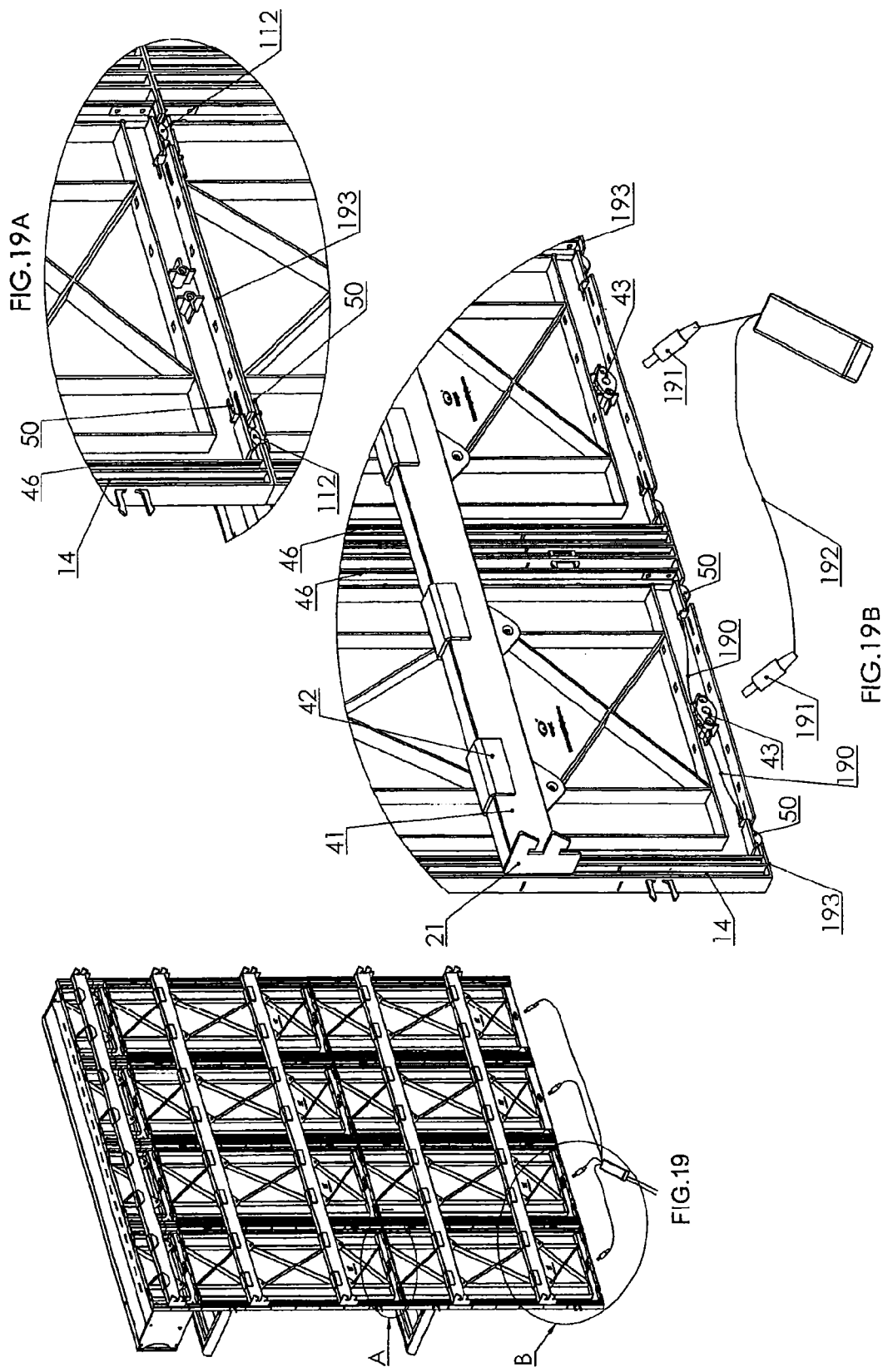
FIG. 19 is a rear perspective view showing the connection of an electric power supply to the bottom of a wall panel assembly of the present disclosure.

Referring again to FIG. 9 and in conjunction with FIGS. 11, 11A, 11B and 11C, the electrical connection between copper strip 50 and copper clip-belt 46 will now be explain in detail. Copper strip 50 is shown in FIGS. 11, 11A, 11B and 11C in perspective view, side view through line "A"-"A", side view through line "B"-"B" and overhead view through line "C"-"C", respectively. As seen in FIG. 11C, copper strip 50 is generally "L"-shaped and is comprised of several distinct portions. When in place in use in conjunction with copper clip-belt 46, copper strip 50 is operatively in position as in FIG. 11C. Portion 110 of copper strip 50 is connected to copper clip-belt 46 by welding. Holes 116 are designed and placed as the welding locations and for simplified and better welding. This is seen in both FIGS. 9B and 19. Adjacent to portion 110 of copper strip 50 is portion 111 that is disposed generally at about 90° to portion 110. Disposed in about mid-length of portion 111 is portion 112. Portion 112 protrudes outside of long end 193 of wall panel 11 and serves to effect electrical contact between vertically adjacent wall panels 11, as can be most clearly seen in FIG. 19A. Portion 112 is shown in FIG. 11C as generally partially circular arc-shaped. This shape of portion 112 is not necessary, and it can be partially oval arc-shaped or any shape that allows for electrical contact between vertically adjacent wall panels. The arc-shaped design of portion 112 helps to ease sliding placement of wall panels 11 into adjacent contact along the long ends 193 as the wall panels 11 are placed into position while assembling the wall display unit 10. Next, copper strip 50 has portion 113 that is disposed also approximately 90° to portion 111, and portion 113 is disposed generally parallel to portion 110 and in the same plane as portion 110 in relation to portion 111. After a short distance along portion 113, portion 114 is formed. Portion 114 is disposed at approximately 90° in relation to portion 113 and is generally parallel to portion 111, but offset therefrom as can be seen in FIG. 11c. Portion 114 has opening 115 therein for accepting electrical connection to electric wire 190, as shown in FIG. 19.

Figure 18:
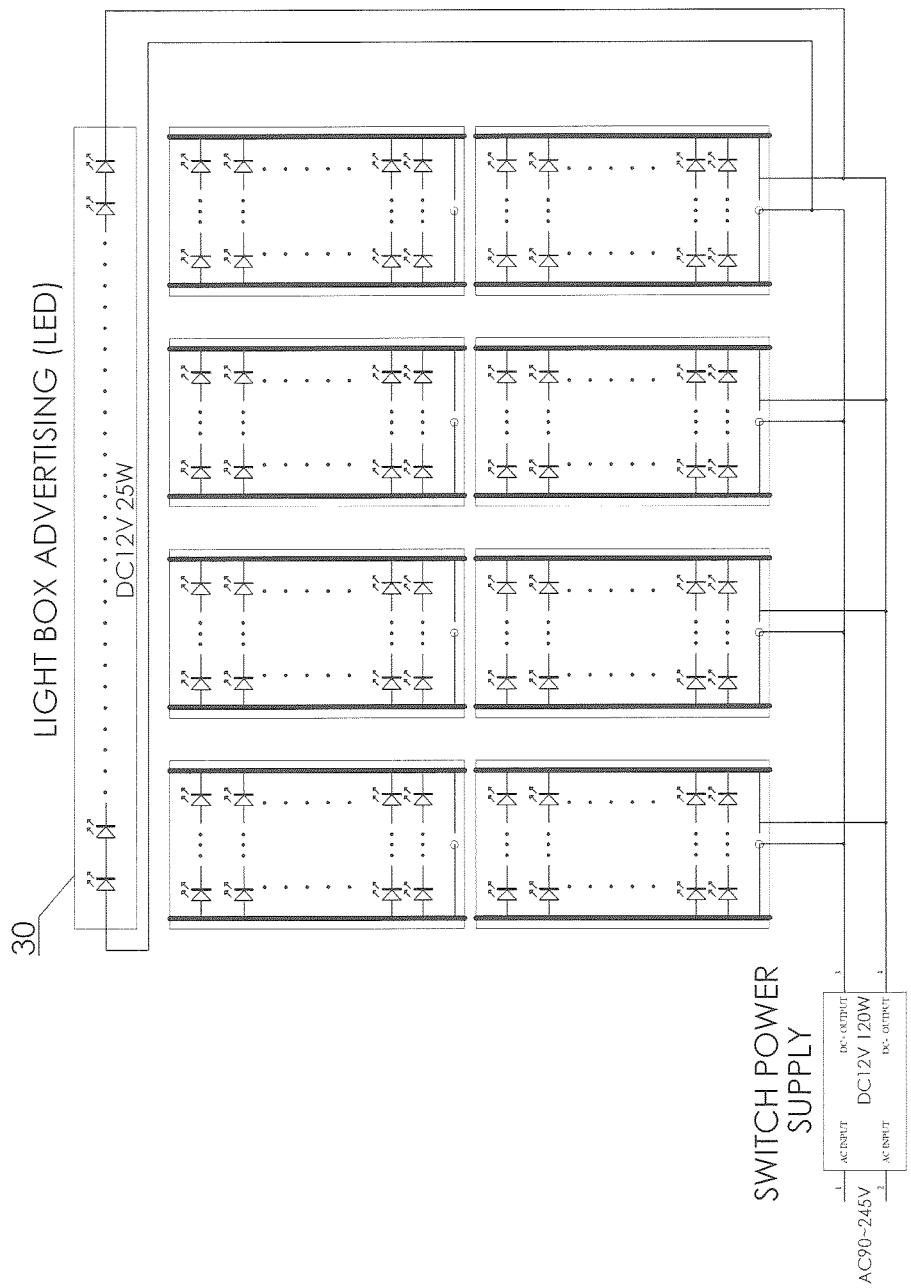
FIG. 18 is an electrical diagram showing the electric circuitry of the present disclosure.

Thus, as a result of description and components described above, the electrical connection and flow from power source 192 to carry trays and LED strips are now complete. Electricity from power source 192 is supplied to plug 191 and then to socket 43. From socket 43, connecting wires 190 and copper strip 50, electricity is supplied to copper clip-belt 46. Electricity from copper clip-belt 46 is then supplied to carry tray 12 via connector tabs 61 and then to LED strip 84 via metal connector 80, connector head 83 and copper snap-in pole 82. Electricity flows across LED strip 84 and out from carry tray 12 via copper snap-in pole 82, connector head 83, metal connector 80 and connector tab 61 located on opposite end of carry tray 12. Also, as shown in the related Figures, metal connectors 80 are interior of brackets 60 and therefore minimize or eliminate the potential for contact with connectors 80 by a user. This arrangement serves to further minimize exposure to a user of electric current communicated through connectors 80. Electricity is transferred from long end 193 of one wall panel 11 to long end 193 of another wall panel 11 vertically disposed in relation thereto via copper strips 50 that contact each other via arc-shaped portions 112, as shown in FIG. 19, and the electric circuit is complete. A representative electric flow for the wall display unit 10 of the present disclosure is depicted in FIG. 18. FIG. 18 shows a separate electric supply to LED display 30 that serves to alert shoppers that products are available at the indicated wall display unit.

FIGS. 13-17 show various trays for carrying merchandise for placement in the wall display unit 10 of the present disclosure.

Figure 13:
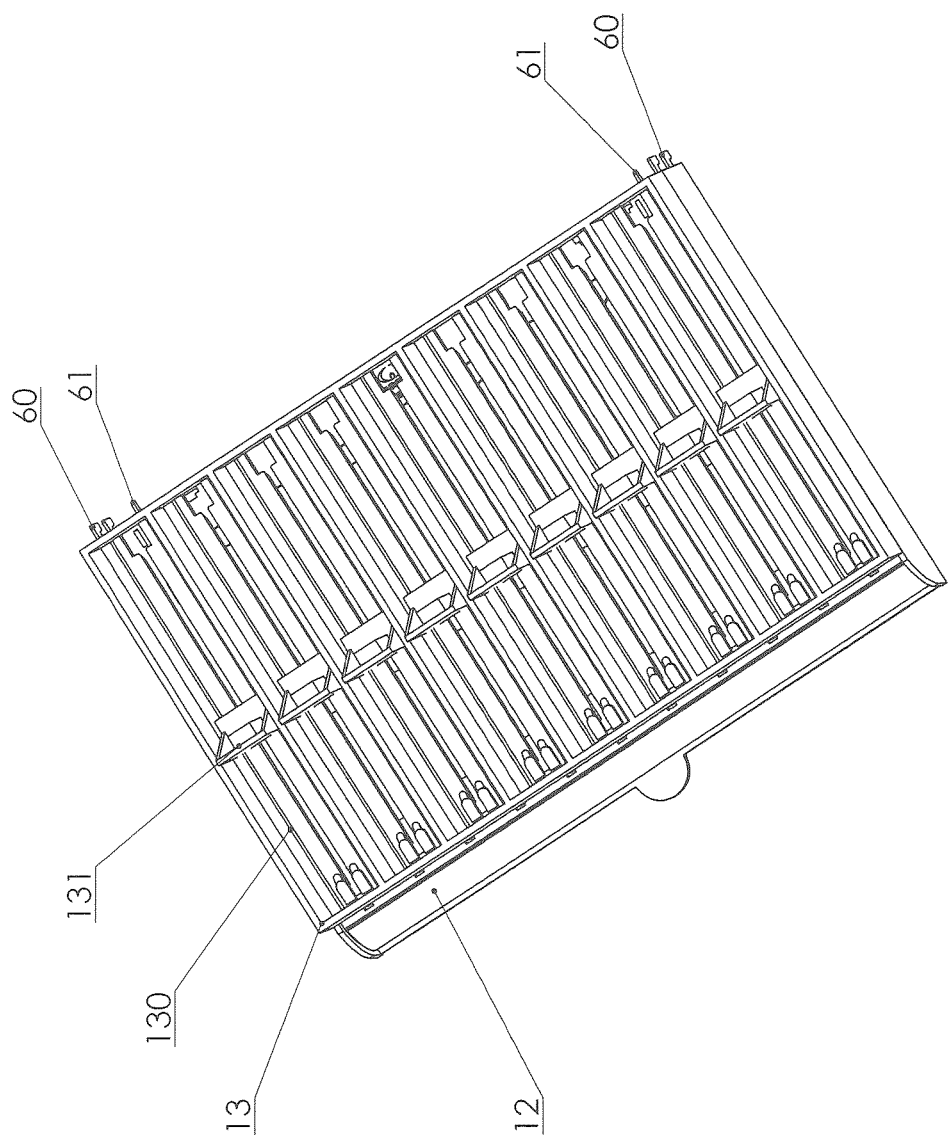
FIG. 13 is a perspective view of a carry tray with insert tray, as shown in FIG. 1, of the present disclosure.

FIG. 13 shows assembled carry tray 12 with insert tray 13 thereon. Also shown as described earlier are brackets 60 for insertion into standard slots 16 of standard 14 and connector tabs 61 for insertion into connector tab slots 17 (not shown in FIG. 13). FIG. 13 also shows insert tray slots 130 and pusher bars 131. Both slots 130 and pusher bars 131 are parts of a known spring pusher assembly that pushes merchandise, such as nail polish bottles or similar items of merchandise, forward in insert tray slots. Pusher bars 131 serve to advance remaining merchandise (not shown) forward in carry tray slots 130 as merchandise is removed. Insert tray 13 can be adapted to multi-facing displacement by putting insert tray 13 with required facing on carry tray 12.

Figure 14:
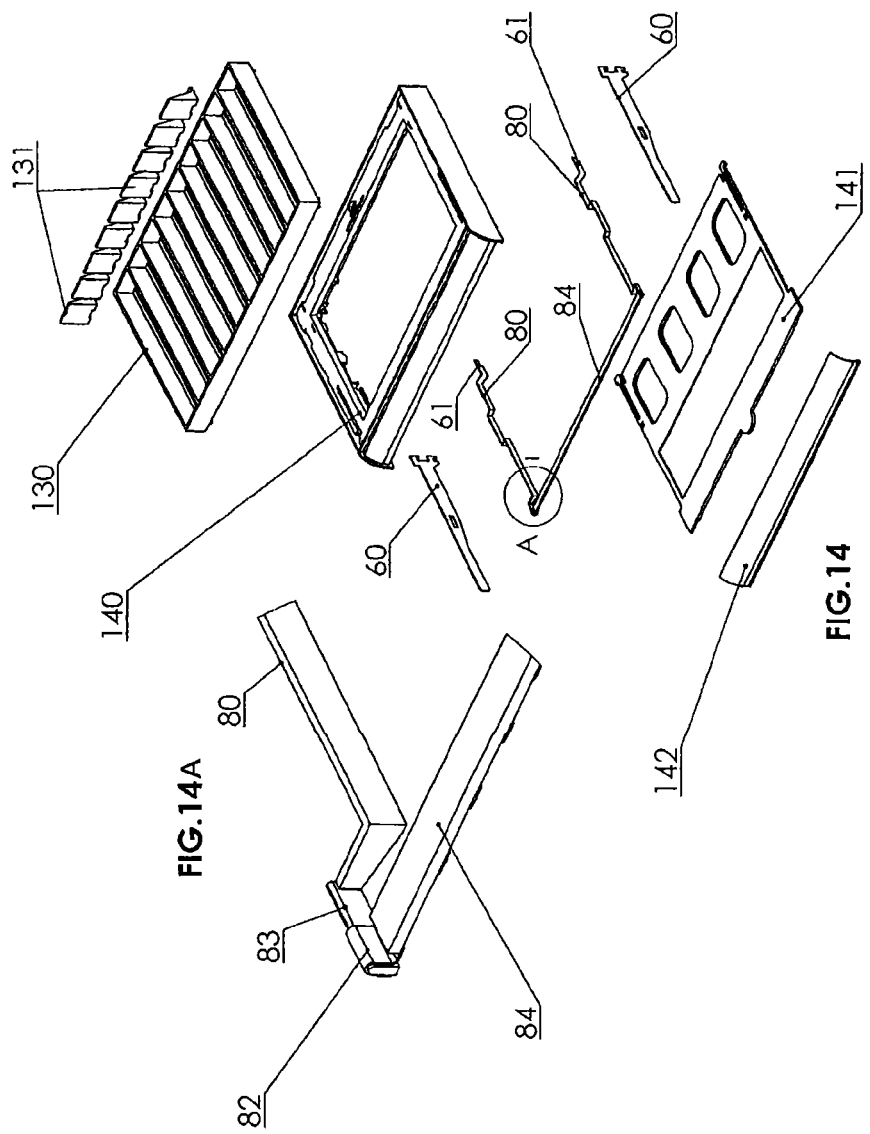
FIG. 14 is an exploded view of a carry tray with insert tray, as shown in FIG. 13, of the present disclosure.

FIG. 14 shows an exploded view of carry tray 12 and inset tray 13. Pusher bars 131 insert into insert tray slots 130, and serve the purpose as hereinbefore described. Carry tray 12 is comprised of carry tray base 140, barcode plate 141 and data strip 142. FIG. 14A shows an enlarged view of section "A" of FIG. 14, showing LED strip 84 and copper snap-in pole 82, metal connector 80, connector head 83 and connector tab 61, the details of that are shown more clearly in FIG. 8B.

Figure 15:
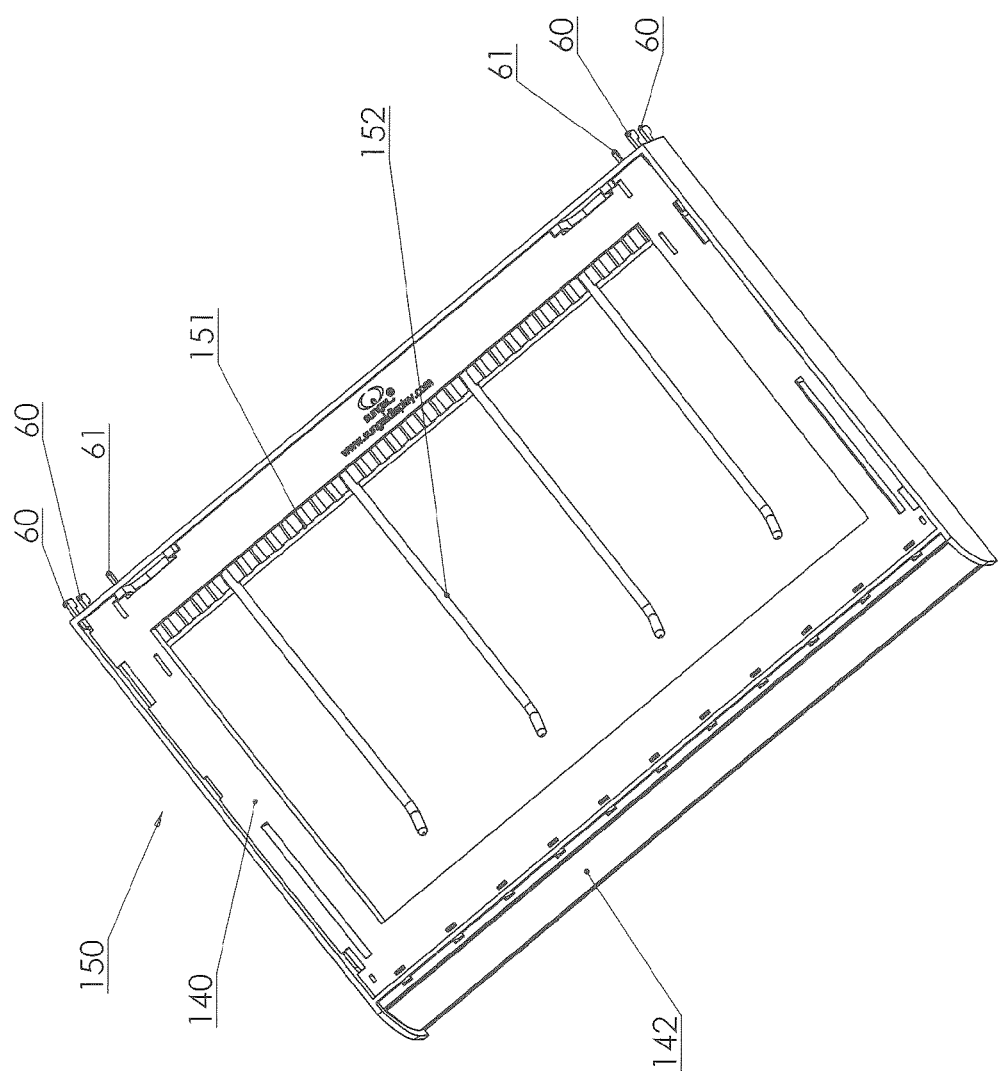
FIG. 15 is a perspective view of a peg hook tray with hooks of the present disclosure.
Figure 16:
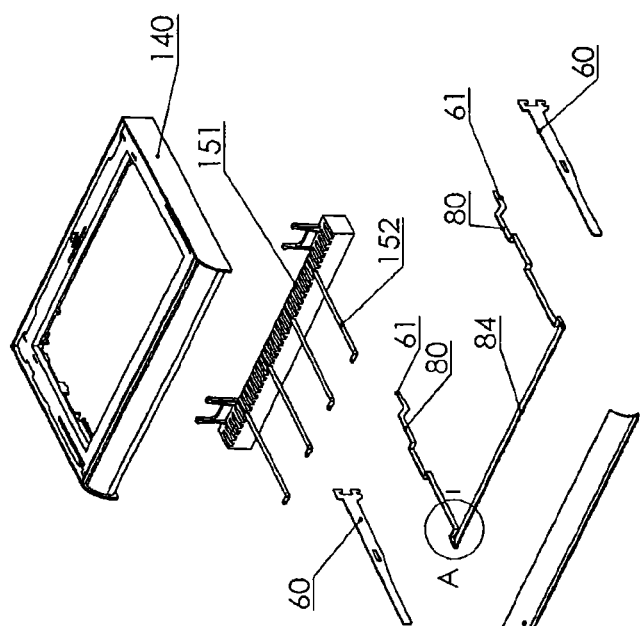
FIG. 16 is an exploded view of a carry tray with hooks, as shown in FIG. 15, of the present disclosure.
Figure 16A:
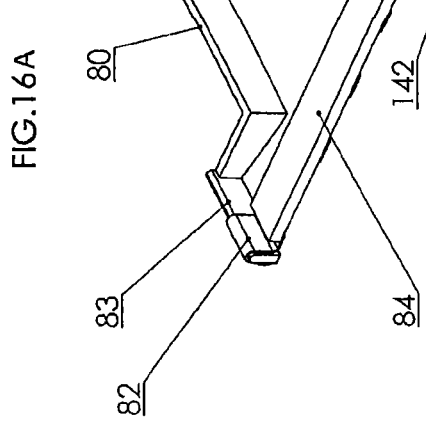
FIG. 16A is an enlarged view of a section of part of the electrical connections of the carry tray, as shown at "A"

FIG. 15 shows peg hook bar tray 150. Peg hook bar tray 150 is comprised of carry tray base 140, peg hook holder 151 and peg hooks 152. Also shown in FIG. 15 are data strip 142 and support brackets 61 and connector tabs 60. FIG. 16 is an exploded view of the peg hook bar tray 150 of FIG. 15, where like parts are like numbered. As is known in the art, peg hook bar tray 150 is for holding merchandise that is sealed in "card-like" packaging having holes at or near the top. The holes are placed onto peg hooks and the merchandise is suspended for viewing by shoppers.

Figure 17:
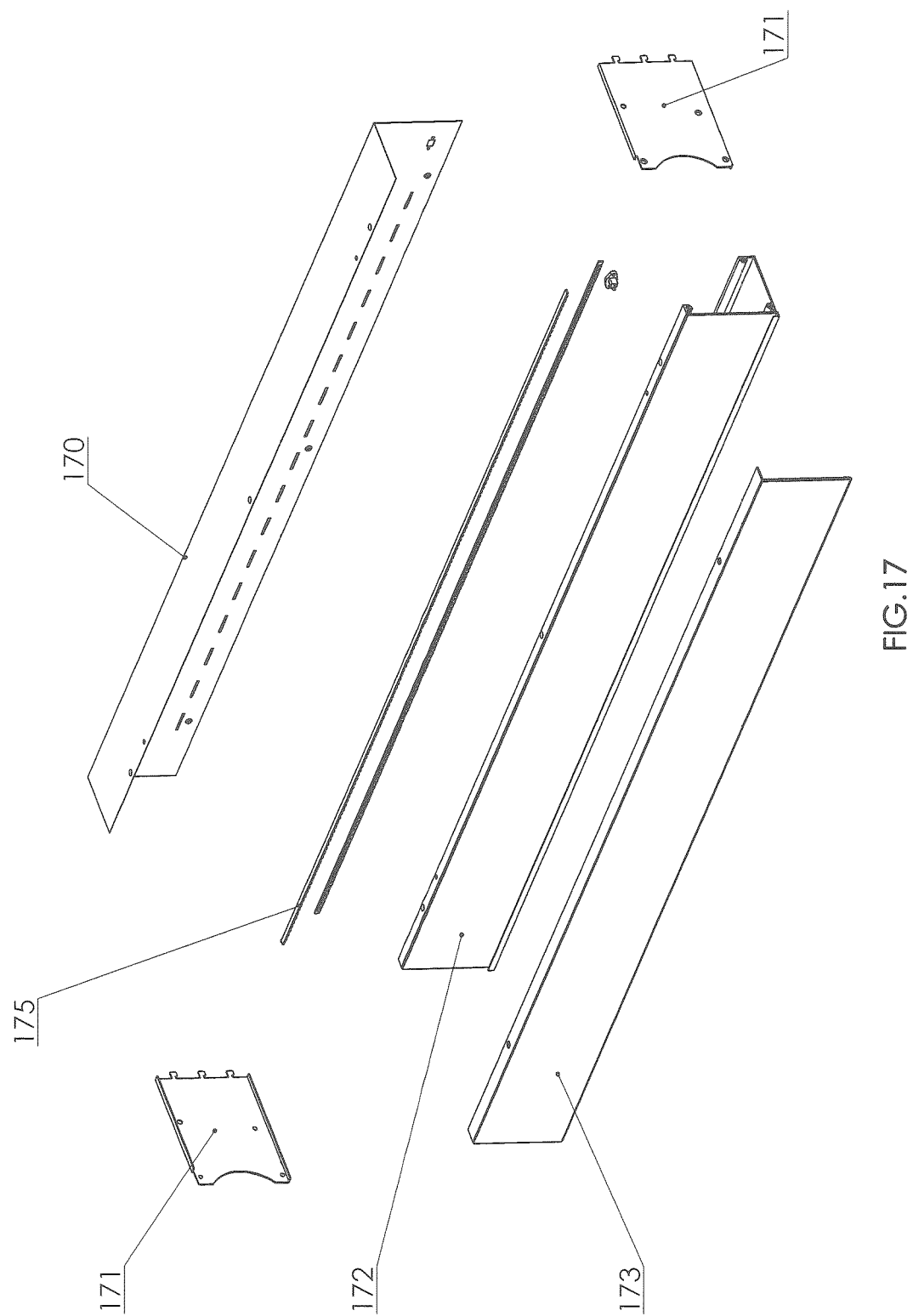
FIG. 17 is an exploded view of an LED light header, as shown in FIG. 3, of the present disclosure.

FIG. 17 shows an exploded view of LED light header 30. LED light header 30 is comprised of back-top panel 170, left and right bracket panels 171, front-bottom panel 172, front panel 173 and LED strip 175.

FIGS. 20-26 show an alternate embodiment of the present disclosure.

Figure 20:
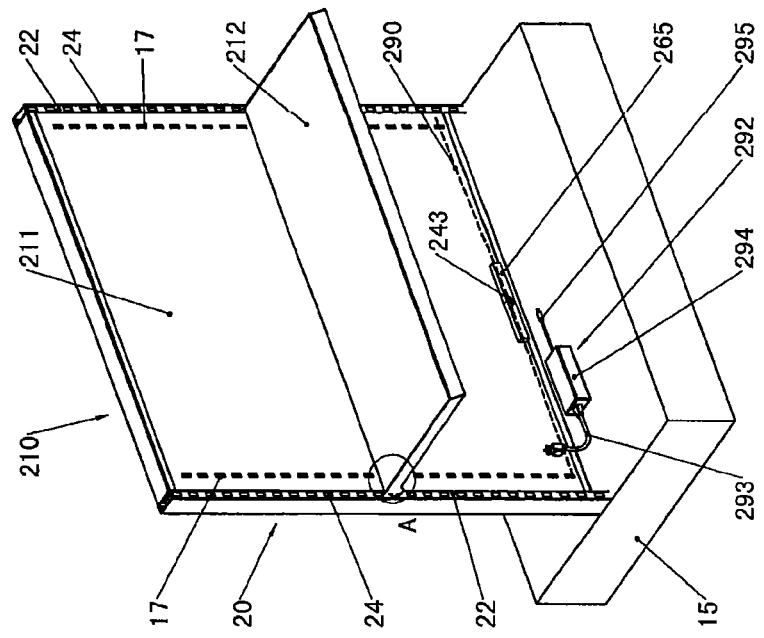
FIG. 20 is a perspective view of a display assembly of an alternative embodiment of the present disclosure having a wall panel that replaces a pegboard in a gondola.
Figure 20A:
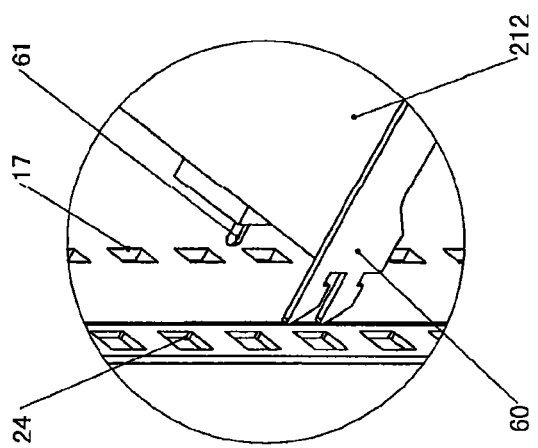
FIG. 20A is an enlarged view of the detail shown at "A" in FIG. 20.

FIG. 20 shows wall display unit 210 that comprises base 15, gondola 20, uprights 22, a wall panel 211, a shelf 212, a power source 292, connector tab slots 17, gondola slots 24, a socket 243, plastic cover 265 and connector wire 290 (disposed behind wall panel 211). Gondola 20 typically comprises two uprights 22, deck 15, cross bars (top, bottom and middle behind wall panel 211, not shown in FIG. 20). As shown previously in, e.g., FIG. 1, a pair of oppositely disposed connector slots 17 is arranged vertically along wall panel 211. Behind each set of connector slots 17 on back of wall panel 211 is copper clip-belt 46 (see, e.g., FIG. 4, these may be different in sizes to accommodate the size (length) of wall panel 11). FIG. 20A shows an enlarged detail of section "A" of FIG. 20. Shelf 212 has brackets 60 (see, e.g., FIG. 8, these may be of different in sizes and shapes depending on the configuration of gondola slots 24) that insert into gondola slots 24 and connector tabs 61 that insert connector tab slots 17. Although power source 292 is shown in FIG. 20 as exposed outside of base 15, in practice, when gondola 20 is assembled, power source 292 is placed under deck 15. Power source 292 includes one AC 110 V cord 293, one DC 24 V adaptor 294 and one DC 24 V output cord 295. DC 24 V output cord 295 plugs into socket 43 at the bottom of wall panel 211, and through connector wire 290 provides power to copper clip-belt 46 (not shown in FIG. 20). Typical wall panel widths are 36" and 48", but can be any width such as 12", 20" or 24". Typical wall panel heights are 54", 60", 66", 78", 84", but can be any height such as 24", 36" or 50".

FIG. 21 shows wall display unit 210 assembly process is as usual and known to those of skill in the art. Deck 15 is first assembled uprights 22 are placed thereon. A bottom cross bar 215 and middle cross bar 220 are affixed to uprights 22 in the usual manner. A top cross bar 225 will be set in place after wall panel 211 is inserted, as described below. Bottom cross bar 215 and top cross bar 225 are of dimension "A" that is substantially the same as the dimension "B" of outer edges of uprights 22. On the other hand, middle cross bar 220 is of a dimension "C" that is less than dimension "B". As a result of the differences in dimensions "A" and "B" vis-à-vis "C", there is a gap "D" (see, FIG. 21C) between bottom cross bar 215/top cross bar 225 and middle cross bar 220. Wall panel 211 is inserted into the gap from top of gondola 20 to bottom in the direction of arrow "E". Once wall panel 211 is in place, top cross bar 225 is set in place. This action essentially "locks" wall panel 211 in place in position in gondola 20. Usually there are two faces in gondola 20. Middle cross bar 220 is designed so that dimension "C" is a size to allow two wall panels 211 to be inserted into gap "D" on both sides of middle cross bar 220. In addition, dimension "D" is designed to be sufficient to accept wall panel 211 having copper clip-belt 46 affixed thereto. As an example, a typical depth of gondola upright 22 is 2⅝", a total thickness of wall panel 211 and copper clip-belt 46 is less than ¾" and the depth of middle cross bar 220 is 1". There are hooks 230 on the inside of uprights 22 for affixing middle cross bar 220. If necessary, a number of middle cross bars 220 may be used for additional lateral support. For gondola 20/uprights 22/gondola slots 24 and wall panel 211 of assembled display unit 210, no merchandise is supported by wall 211 panel itself. In this respect, display unit 210 differs from display unit 10 shown in FIGS. 1-19. All loads with respect to display unit 210 are supported by shelf 210, gondola 20 and uprights 22 through brackets 60 inserted into gondola slots 24. Without limitation, wall panel 211 may be made of wood, MDF or plastic.

FIG. 21A shows a rear view of wall panel 211 with copper clip-belt 46 affixed thereto. FIG. 21B shows the cross-section of the wall panel 211 of FIG. 21A. FIG. 21C shows a double faced structure of assembled display unit 210 described above. FIG. 21D shows the detail structure of wall panel 211 having copper clip-belt 46 affixed thereto. Copper clip-belt is same as that shown in FIG. 10, but may be in different sizes. Copper clip-belt 46 in FIG. 21D is shielded by a plastic cover 235 as electric insulation. There are dot and thin thermal resistance material (not shown, but similar to element 240, mentioned below) placed between copper clip-belt 46 and plastic cover 235 to meet safety requirements. In addition, there is also thin thermal resistant sheet 240, such as mica or other materials between wall panel and copper clip-belt for safety requirements. Copper clip-belt 46 may be affixed to wall panel 211 by plastic pins, plastic screws or any similar non-conductive fastener. As with the embodiment of the present disclosure described with respect to FIGS. 1-19, connector tab 61 of shelf 212 is inserted into copper clip-belt 46 via connector tab slots 17.

Figure 22A:
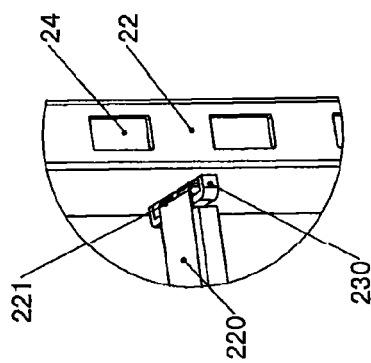
FIG. 22A shows the detail of a support cross bar engaged in a retaining snap-on bracket at "A" in FIG. 22.
Figure 22:
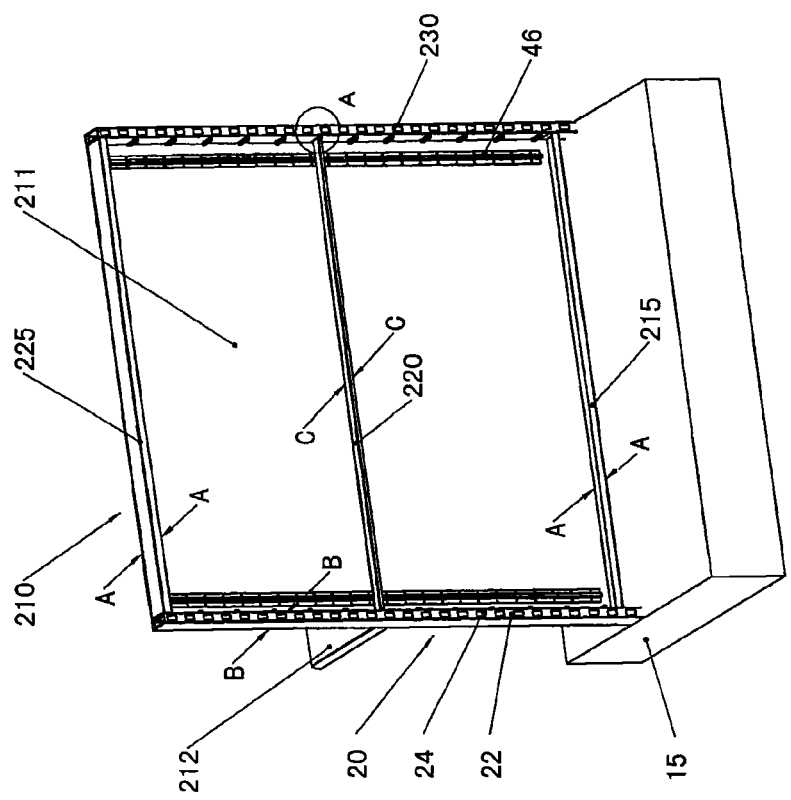
FIG. 22 is a perspective rear view of the display assembly of FIG. 20.

FIG. 22 is a perspective back view of assembled gondola 20, uprights 22, gondola slots 24, bottom cross bar 215, middle cross bar 220 and top cross bar 225, shelf 212, hooks 230, copper clip-belt 46 and wall panel 211. Two oppositely disposed wall panels 211 having oppositely disposed and copper clip-belts 46 (second wall panel 211 not shown in FIG. 22) are placed between wall panel 211 and middle cross bar 220. Tab end 221 of middle cross bar 220 connects on the gondola hooks 230 as shown in FIG. 22b.

Thus far what has been described with respect to the embodiment of the present disclosure shown in FIGS. 20-22 may be used with a shelf having electrical connections similar to those as shown with respect to carry tray 12 in, e.g., FIGS. 8, 8A and 8B. The differences with respect to the embodiment described with respect to FIGS. 20-22 as compared to the embodiment described with respect to FIGS. 1-19 reside primarily in replacing pegboard 23 with wall panel 211. However, the embodiment of FIGS. 20-22 may also be modified to accommodate retrofitting existing display units 210 to function in accordance with the present disclosure. Also, the embodiment of FIGS. 20-22 may be used for customized free-standing displays comprising tubing and panels. This aspect of the present disclosure will become apparent to those of skill in the art based upon the following description.

Figure 23:
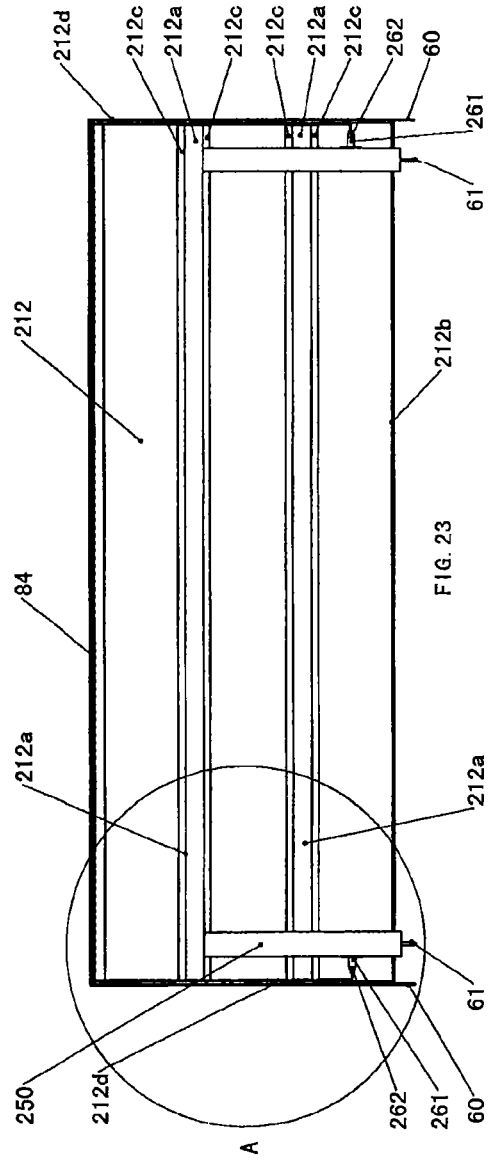
FIG. 23 is a bottom view of a shelf shown in FIG. 20.
Figure 23C:
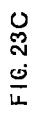
FIGS. 23B and FIG. 23C are isometric views of the plastic pole locking block shown in FIG. 23A.
Figure 23B:
Figure 23A:
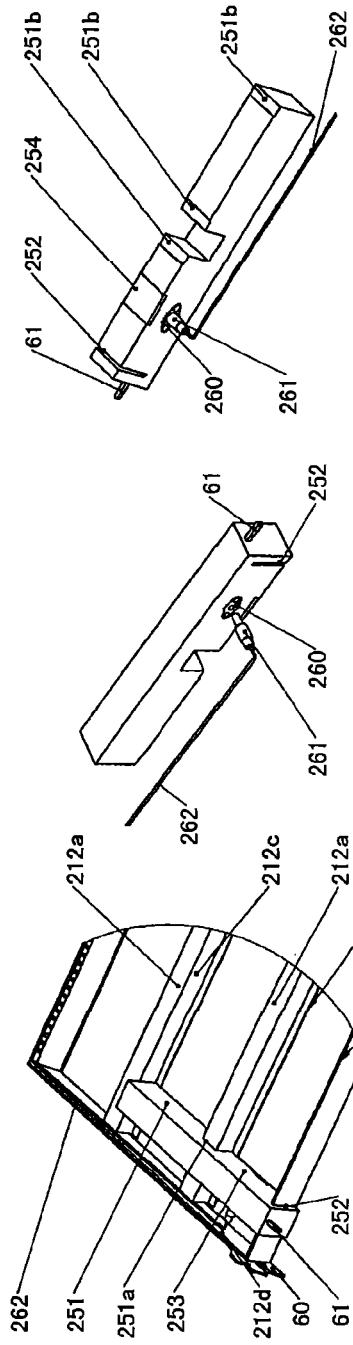
FIG. 23A is an enlarged view of the plastic pole locking block shown at "A" in FIG. 23.

FIG. 23 shows a perspective bottom view of shelf 212 and illustrates a plastic pole locking block 250 which is one of the key components of retrofitting or a customized gondola 20/uprights 22/support slots 24 and wall panel 211 of display unit 210. Plastic pole locking block 250 is preferably firmly affixed at a proper position to ensure proper insertion of connector tabs 61 into connector tab slots 17 of wall panel 211. FIG. 23A shows that plastic pole locking block 250 is designed to provide alignment and association of locking mechanisms on plastic pole locking block 250 with underside of shelf 212. As can be seen in the particular embodiment of shelf 212 in FIG. 23, shelf 212 has two (2) support elements 212A and a rear edge 212B. Support elements 212A provide mechanical support to shelf 212 so that shelf 212 can carry load placed upon it without bending or breaking. As shown in FIG. 23, support elements 212A have flange portions 212C that provide attachment surfaces for support elements 212A to be affixed or attached to underside of shelf 212. As seen in FIG. 23A, plastic pole locking block 250 engages support elements 212A, rear edge 212B and flange portions 212C so as to provide locking engagement therewith. Plastic pole locking block 250, in the embodiment shown in FIG. 23 uses the following locking mechanisms: a rear section 251 designed to fit tightly between the two support elements 212A due to the fit and measurement of an opening 251A so as to accommodate support element 212A, as shown in FIG. 23A; a snap-on slot 252 designed to accommodate rear edge 212B and to provide a front section 253 designed to fit tightly between support element 212A and rear edge 212B, as shown in FIGS. 23A-C; and a strong permanent magnet 254 located at the bottom of front section 253, as shown in FIG. 23C. Plastic pole locking block 250 is also provided with several flange accommodating sections 251B so that plastic pole locking block 250 lays flush with the underside of shelf 212, thus allowing firm association of permanent magnet 254 with the underside of shelf 212. An additional magnet may be similarly located at the bottom of rear section 251 to further increase affixation of plastic pole locking block 250 to the underside of shelf 212. Of course, the measurement of the particular elements of plastic pole locking block 250 will depend on the particular configuration of the underside of shelf 212 for which it is designed to engage. The plastic pole locking block 250 is preferably made of plastic for electrical insulation purposes. In addition, plastic pole locking block 250 is preferably made of a plastic that has sufficient elasticity so as to further ensure tight fit with respect to the elements of the underside of shelf 212. Plastic pole locking block 250 also has a socket 260 designed to accommodate a plug 261 that is connected to a connecting wire 262 that will be more fully explained with respect to FIG. 25. In addition, there is an internal direct wire connection between socket 260 and connector tab 61. Connector tab 61, as discussed with respect to, e.g., FIG. 8, is electrically conductive and of proper in size and shape for inserting into connector tab slot 17. LED strip 84 is at the front underside of shelf 212. Connecting wire 262 can be placed into the gap between side edges 212D of shelf 212 and support elements 212A. As an option, connecting wire 262 can be affixed along the underside of shelf 212 by 3M tape or other fastening devices, preferably non-electrically conductive.

Figure 24:
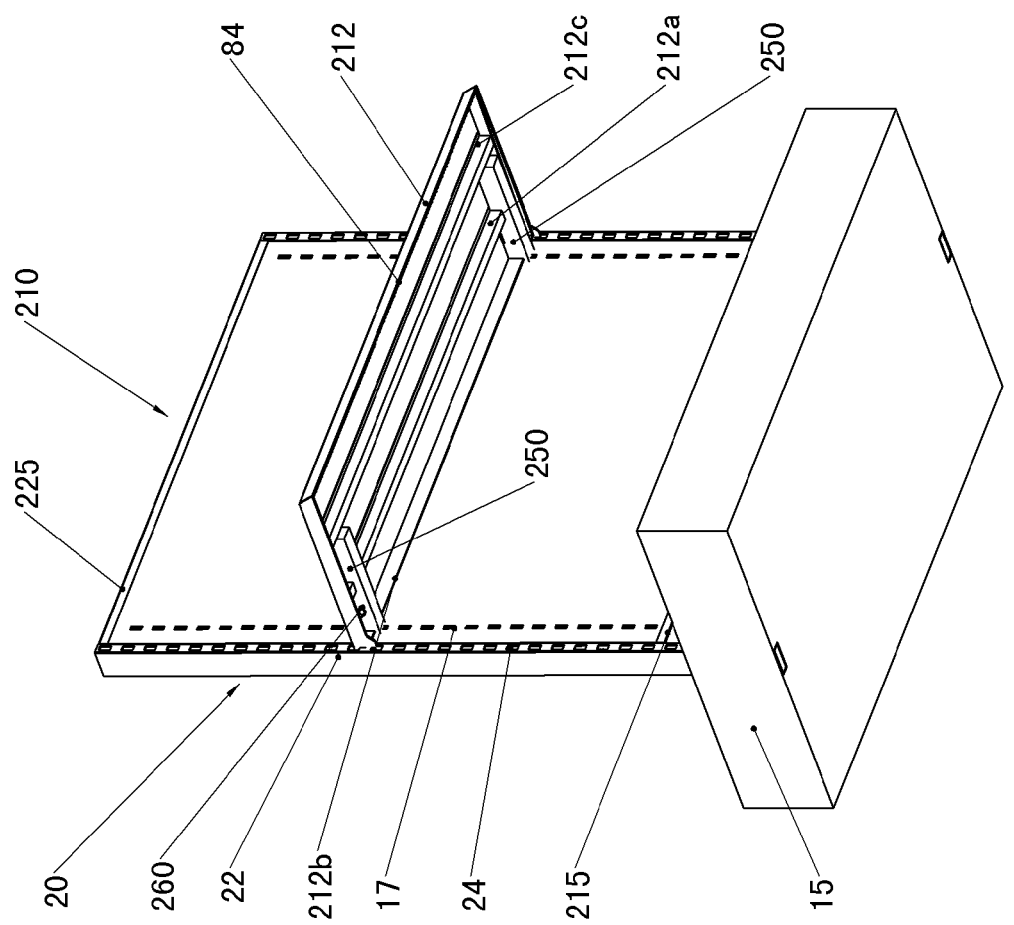
FIG. 24 is a perspective bottom view of the display assembly of FIG. 20.

FIG. 24 is a perspective bottom view of assembled wall display unit 210.

FIG. 25 shows the electric connections and flow from power source to LED strip. DC 24 V electricity is input to two copper clip-belts 46 through socket 243 and wires 290. DC 24 V electricity then flows to plastic pole locking blocks 250 through connector tabs 61 in contact with copper clip-belts 46, and finally across LED strip 84 by connecting plug 261 to socket 260 in plastic pole blocking block 250.

FIG. 26 shows an assembled wall display unit 210 using assembled by four separate wall panels: left wall panel 211A, two center wall panels 211B and right wall panel 211C. A typical wall panel width is 12" such that four (4) wall panels connected side-by-side provide a 48 inch wall panel combination. Wall panel heights are from top cross bar 225 to bottom cross bar 215. There are locking devices between two unit panels, such as locking slots 44 and locking clips 45 (see, e.g., FIG. 7) or mortise and tendon, suitable for horizontal wall panel-to-wall panel connections.

It will be appreciated by those of skill in the art that the embodiments shown in FIGS. 20-26, and in particular shown in FIGS. 23-26, may be designed so as to retrofit an existing gondola with pegboard with the electric elements of the present disclosure, thereby conferring the benefits of the present disclosure on existing gondola systems with the need to incur the cost of replacing the entire gondola system. Also, the embodiment of FIGS. 20-22 may be used for customized free-standing displays comprising tubing and panels.

Moreover, as can been seen from the discussion of the Figures, the electricity-bearing elements of the present disclosure only come in electricity-transferring contact with other elements that are intended to carry electricity, and are prevented from contacting other such non-electricity carrying elements through contact with insulated materials, such as plastic clamps, channels, screws and the like.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A display system comprising:
   at least one wall panel having a front side, a rear side opposite said front side, a length and a width, wherein said wall panel comprises at least a first pair of oppositely disposed support slots arranged vertically along the length of said wall panel and at least a second pair of oppositely disposed slots arranged vertically along the length of said wall panel and disposed inside of said first pair of said slots, and wherein said second pair of oppositely disposed support slots pass through said wall panel from said front side to said rear side;
   an electric source element disposed on said rear side of said wall panel in association with said second pair of oppositely disposed slots; and
   at least one removable product display shelf having a lighting device, a top side and a bottom side, a pair of non-conductive support brackets and a pair of electrical contact elements, wherein said lighting device, said support brackets and said electrical contact elements are disposed about said bottom side of said shelf, wherein said pair of said support brackets are disposed about said shelf so as to align with and secure to said first pair of support slots, wherein said first pair of support slots do not provide access to any electrical source, wherein said electrical contact elements are disposed about said shelf so as to align with and secure to said second pair of support slots, and wherein said electrical contact elements pass through said second pair of support slots from said front to said rear side to contact said electric source element to provide electricity to power said lighting device.

2. A display system according to claim 1, wherein said wall panel comprises two separate channel elements on the rear side thereof, wherein, in one of the two separate channels elements, is disposed a standard for accepting support brackets disposed on the shelf, and wherein, in the other of the two separate channels, is disposed an electric source element for accepting the electrical contact elements disposed on the shelf.

3. A display system according to claim 2, wherein the two channels disposed on the rear side of wall panel are separated by a non-conductive barrier.

4. A display system according to claim 1, wherein the electric contact elements disposed on the shelf transfer electricity through a single electric conduit to an LED strip and then through the LED strip to a the other of the pair of electrical contact elements to effect return of the electricity.

5. A display system according to claim 1 comprising two wall panels, wherein said two wall panels are disposed one above the other, wherein the electricity is conducted between said lower wall panel and said upper wall panel via copper strips, wherein one copper strip is disposed in the upper end of the electric source element of said lower wall panel and extends above the upper end of said lower wall panel, wherein another copper strip is disposed in the lower end of the electric source element of said upper wall panel, and wherein the copper strips of said lower wall panel and said upper wall panel contact each other to conduct electricity between the electric source elements of said lower wall panel and said upper wall panel.

6. A display system according to claim 5, further comprising a second copper strip disposed in the lower end of the electric source element of the lower wall panel, wherein the second copper strip connects to an electric source external to the display system.

7. A display system according to claim 5, wherein the electric source elements are in a spring clip design such that they firmly hold the copper strips.

8. A display system according to claim 1, wherein said electrical contact elements disposed on the shelf provide electricity to the a fixture via extensions of the electrical contact elements disposed at an end of said electrical contact elements opposite of the end of said electrical contact elements disposed in contact with the electric source element, and wherein the extensions of the electrical contact elements conductively contact the light fixture via a u-shaped element at each end of the lighting device.

9. A display system according to claim 1, wherein the support brackets are comprised of metal or plastic and are separate from or integral with the shelf.

10. A display system according to claim 9, wherein said support brackets connect to a pair of support elements that are comprised of metal or plastic disposed on said wall panel on the opposite sides of the width of said wall panel.

11. A display system according to claim 1, comprising two wall panels, wherein said two wall panels are disposed one next to the other, wherein said wall panels are connected to each other via clips disposed on one side of said first wall panel that insert into slots disposed on an adjacent side of said second wall panel.

12. A display system according to claim 1, wherein said at least one wall panel has a width of about 12" and a height of about 6".

13. A display system according to claim 1, wherein said at least one wall panel has a width of about 12" and a height of about 25".

14. A display system comprising:
at least one wall panel having a front side, a rear side opposite said front said, a length and a width;
an electric source element disposed on said rear side of said wall panel; and
at least one shelf comprising a lighting device, a pair of non-conductive support brackets and a pair of electrical contact elements, wherein said wall panel comprises two sets of rows of oppositely disposed parallel slots along the length of said wall panel, wherein a first set of rows of oppositely disposed parallel slots provides cooperative access for said support brackets to support said shelf, wherein said support brackets do not carry any electrical circuitry for said lighting device, wherein a second set of rows of oppositely disposed parallel slots pass through said wall panel from said front side to said rear side to provide cooperative access for said electrical contact elements to pass through said wall panel from said front side to said rear side and contact said electric source element to provide electricity to said lighting device, wherein said electrical contact elements disposed on said shelf do not make electric contact with said support brackets disposed on the shelf.

15. A display system comprising:
a base;
at least two substantially parallel uprights disposed substantially vertically on said base, said uprights each having at least one row of slots disposed vertically along a length of said uprights;
at least one wall panel disposed between said uprights, said at least one wall panel having a front side and a rear side and at least one row of slots disposed vertically along a length of the wall panel, wherein said vertically disposed slots pass through said wall panel from said front side to said rear side;
an electric source element disposed on said rear side of said wall panel, in association with said second pair of oppositely disposed slots; and
at least one shelf comprising a lighting device, support brackets and electrical contact elements, wherein said at least one row of slots disposed vertically on said uprights provides cooperative access for said support brackets disposed on said shelf for supporting the shelf, wherein said support brackets do not carry any of the electrical circuitry for the lighting device, wherein said at least one row of slots disposed vertically on said wall panel provide cooperative access for said electrical contact elements disposed on said shelf to pass through said wall panel and contact said electric source element to provide electricity to said lighting device, wherein said electrical contact elements disposed on the shelf do not make contact with said support brackets disposed on said shelf.

16. A display system according to claim 15, wherein said electric source element comprises a pair of conductive channels configured to accept said electrical contact elements disposed on the shelf.

17. A display system according to claim 16, wherein each of the pair of conductive channels further comprises an insulating cover.

18. A display system according to claim 17, wherein each of the pair of conductive channels is separated by a thermal resistance barrier from said insulating cover and said wall panel.

19. A method of providing electric current to a shelf having a lighting device to an existing display system having a base and at least two substantially parallel uprights disposed substantially vertically on said base, wherein each of said at least two substantially parallel uprights has at least one row of slots disposed vertically along a length of said uprights, the method comprising:
disposing at least one wall panel between said at least two substantially parallel uprights, wherein said at least one wall panel has at least one row of slots disposed vertically along a length of said wall panel, wherein said slots disposed in said wall panel pass through said wall panel from said front side to said rear side;
disposing an electric source element disposed on said rear side of said wall panel in association with said slots in said wall panel; and
disposing on said wall panel at least one shelf comprising a lighting device, support brackets and electrical contact elements, wherein said at least one row of slots disposed on said each of said at least two substantially parallel uprights provides cooperative access for said support brackets for supporting said shelf, wherein said support brackets do not carry any of the electrical circuitry for the lighting device, wherein said at least one row of slots disposed on said wall panel provide cooperative access for said electrical contact elements disposed on said shelf to pass through said wall panel and contact said electric source element to provide electricity to the lighting device, wherein the electrical contact elements do not make contact with the support brackets.

* * * * *